United States Patent [19]

Kamo et al.

[11] Patent Number: 5,541,773
[45] Date of Patent: Jul. 30, 1996

[54] TWO-UNIT ZOOM LENS SYSTEM

[75] Inventors: Yuji Kamo, Hino; Hideyasu Takato, Hachioji, both of Japan

[73] Assignee: Olympus Optical Co., Ltd., Tokyo, Japan

[21] Appl. No.: 217,852

[22] Filed: Mar. 25, 1994

[30] Foreign Application Priority Data

Mar. 26, 1993 [JP] Japan .................. 5-068004

[51] Int. Cl.⁶ .................... G02B 15/14
[52] U.S. Cl. .................... 359/692; 359/714
[58] Field of Search ............... 359/692, 717, 359/795, 713–715

[56] References Cited

U.S. PATENT DOCUMENTS

| | | | |
|---|---|---|---|
| 4,836,660 | 6/1989 | Ito | 359/692 |
| 5,113,287 | 5/1992 | Nakayama | 359/676 |
| 5,218,478 | 6/1993 | Itoh | 359/692 |
| 5,227,920 | 7/1993 | Shibayama | 359/692 |
| 5,309,285 | 5/1993 | Ito | 359/692 |
| 5,315,440 | 5/1994 | Betensky et al. | 359/612 |
| 5,327,290 | 7/1994 | Fukushima | 359/692 |

FOREIGN PATENT DOCUMENTS

| | | |
|---|---|---|
| 62-56917 | 3/1987 | Japan . |
| 6442618 | 2/1989 | Japan . |
| 3116110 | 5/1991 | Japan . |
| 3146916 | 6/1991 | Japan . |
| 3260610 | 11/1991 | Japan . |
| 493810 | 3/1992 | Japan . |
| 4161914 | 6/1992 | Japan . |
| 5113537 | 5/1993 | Japan . |
| 5188293 | 7/1993 | Japan . |
| 5188292 | 7/1993 | Japan . |
| 5224122 | 9/1993 | Japan . |

*Primary Examiner*—David C. Nelms
*Assistant Examiner*—Son Mai
*Attorney, Agent, or Firm*—Cushman, Darby & Cushman

[57] ABSTRACT

A low-cost, high-performance two-unit zoom lens system for use with a compact camera, which has a zoom ratio of about 2 to 2.5. The zoom lens system has a 1-st lens unit (G1) of positive power, and a 2-nd lens unit (G2) of negative power. The 1-st lens unit (G1) is composed of a plastic lens (L1) of extremely small power having an aspherical surface, and a positive lens group consisting of lens elements (L2) and (L3). The 2-nd lens unit (G2) is composed of a positive lens (L4), and a negative lens (L5) having an aspherical surface.

43 Claims, 27 Drawing Sheets

(a)

(b)

(c)

Fig.7(a)(1)  Fig.7(a)(2)  Fig.7(a)(3)  Fig.7(a)(4)
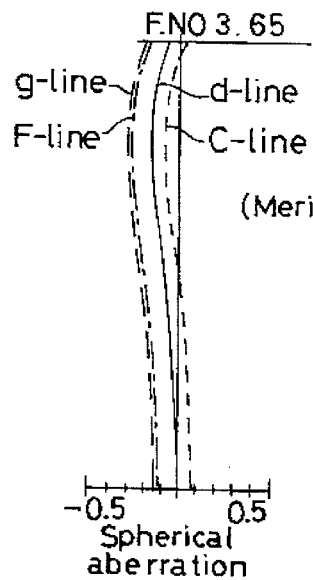
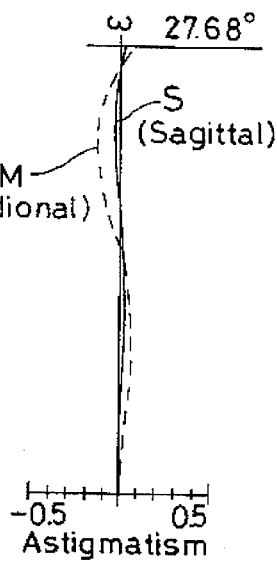
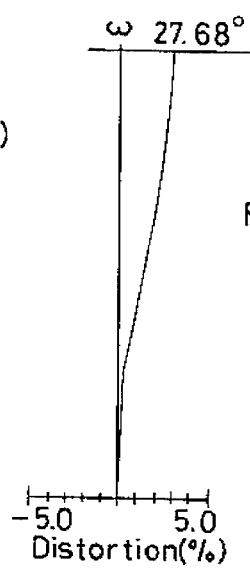
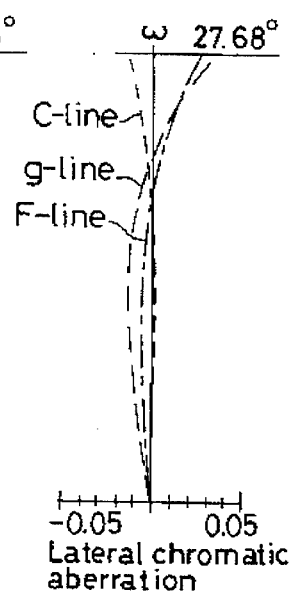
Fig.7(b)(1)  Fig.7(b)(2)  Fig.7(b)(3)  Fig.7(b)(4)
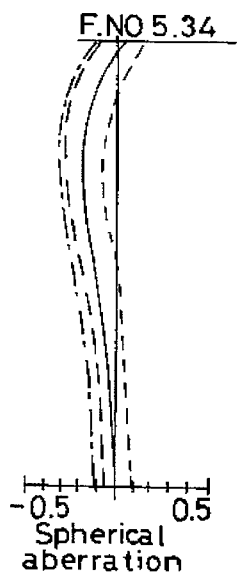
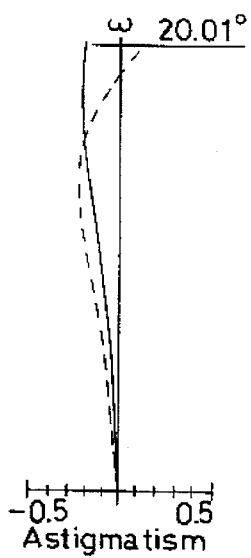
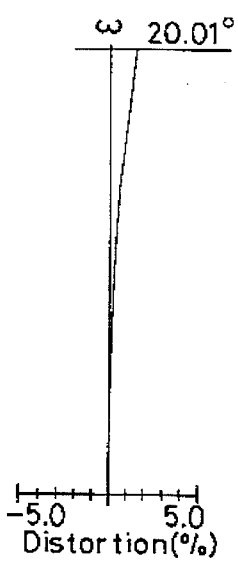
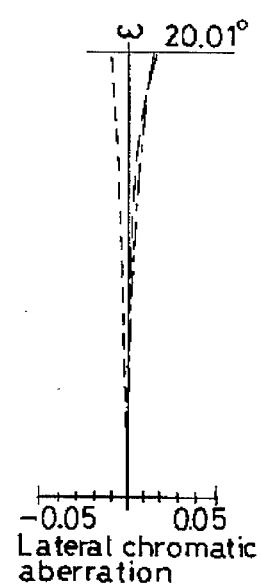

Fig.7(c)(1)　Fig.7(c)(2)　Fig.7(c)(3)　Fig.7(c)(4)
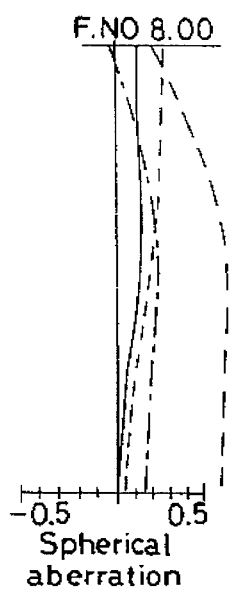
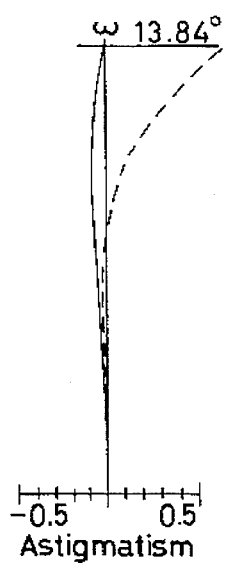
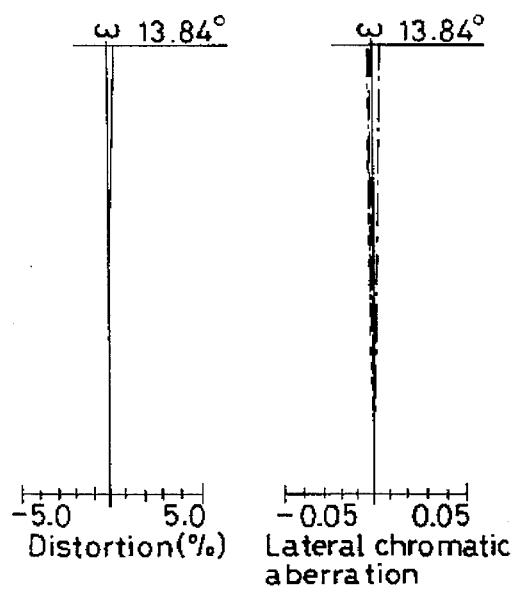

Fig. 8(a)(1)       Fig. 8(a)(2)       Fig. 8(a)(3)       Fig. 8(a)(4)
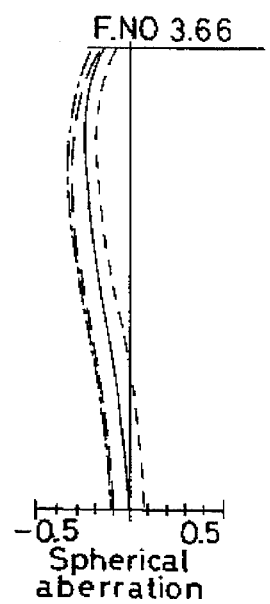
F.NO 3.66
-0.5    0.5
Spherical
aberration
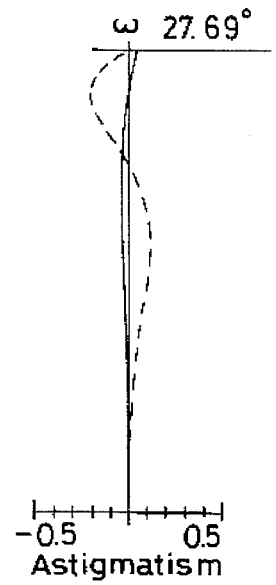
ω 27.69°
-0.5    0.5
Astigmatism
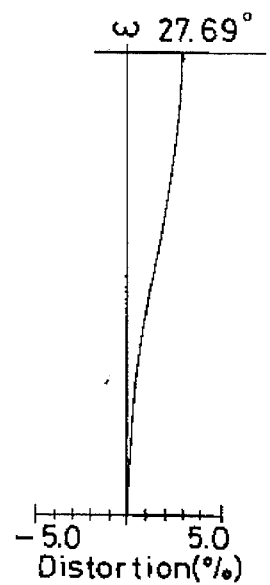
ω 27.69°
-5.0    5.0
Distortion(%)
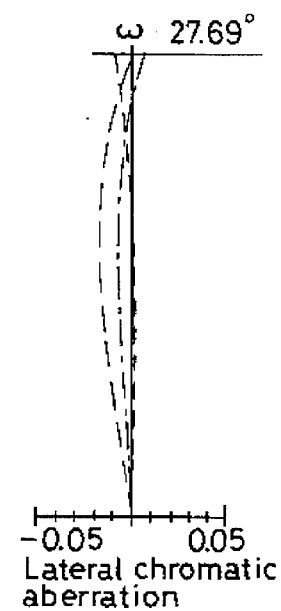
ω 27.69°
-0.05    0.05
Lateral chromatic
aberration
Fig. 8(b)(1)       Fig. 8(b)(2)       Fig. 8(b)(3)       Fig. 8(b)(4)
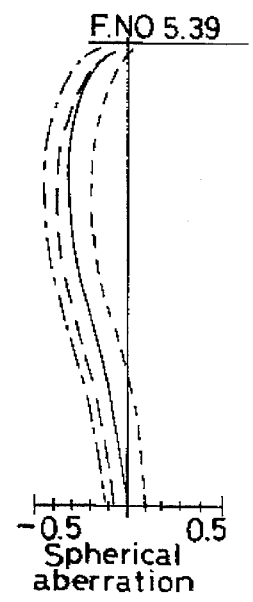
F.NO 5.39
-0.5    0.5
Spherical
aberration
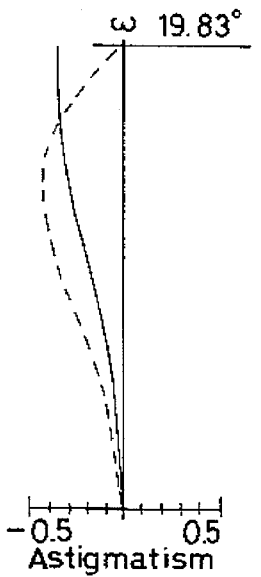
ω 19.83°
-0.5    0.5
Astigmatism
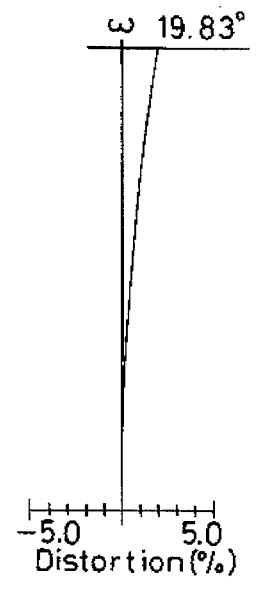
ω 19.83°
-5.0    5.0
Distortion(%)
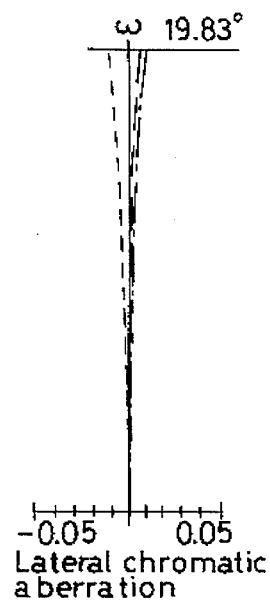
ω 19.83°
-0.05    0.05
Lateral chromatic
aberration

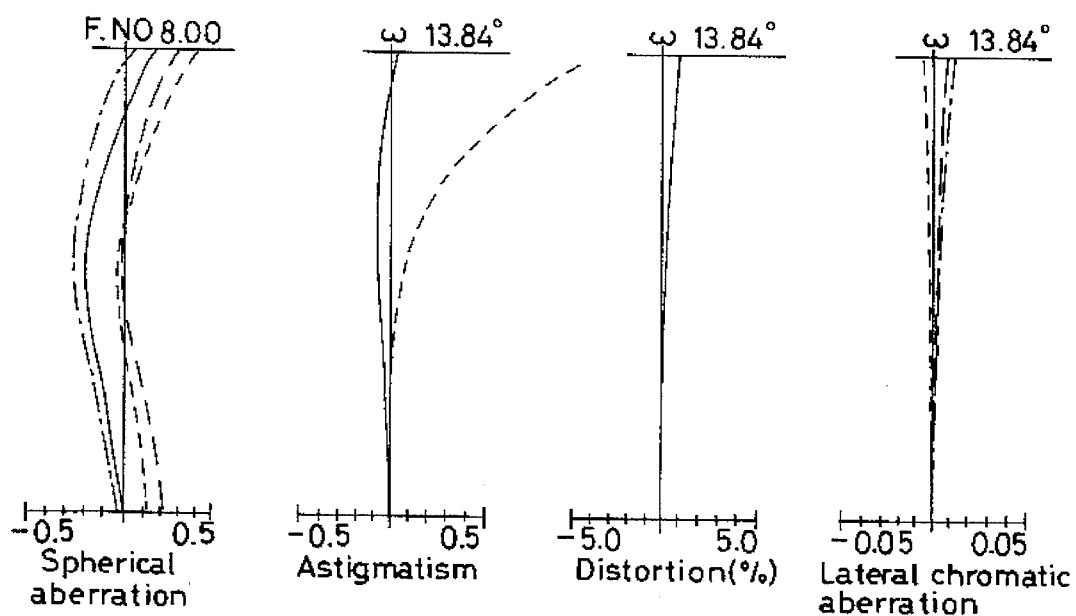

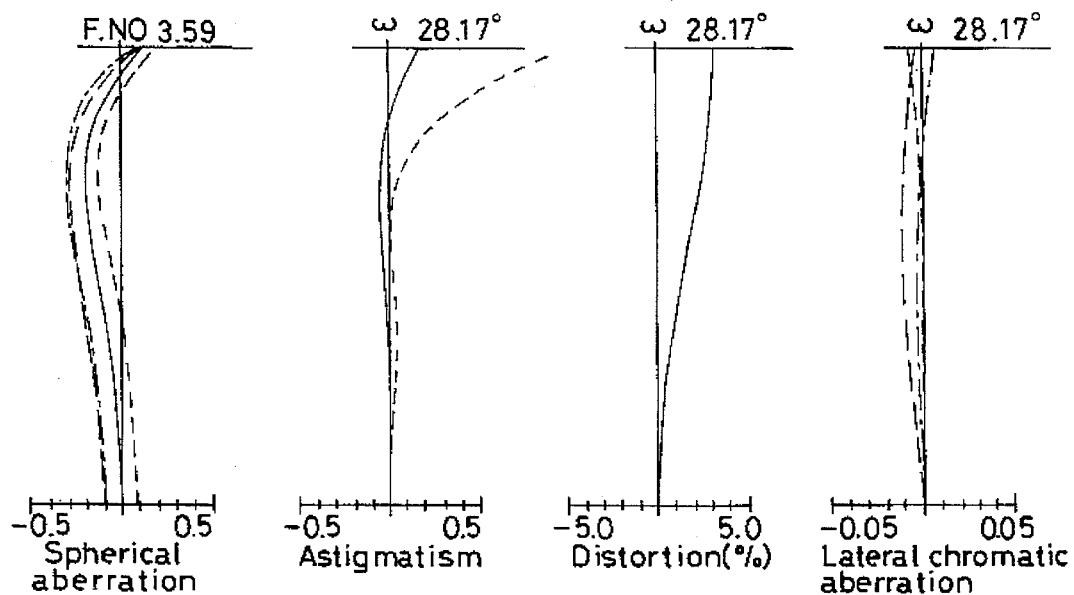
Fig. 9(a)(1) Fig. 9(a)(2) Fig. 9(a)(3) Fig. 9(a)(4)
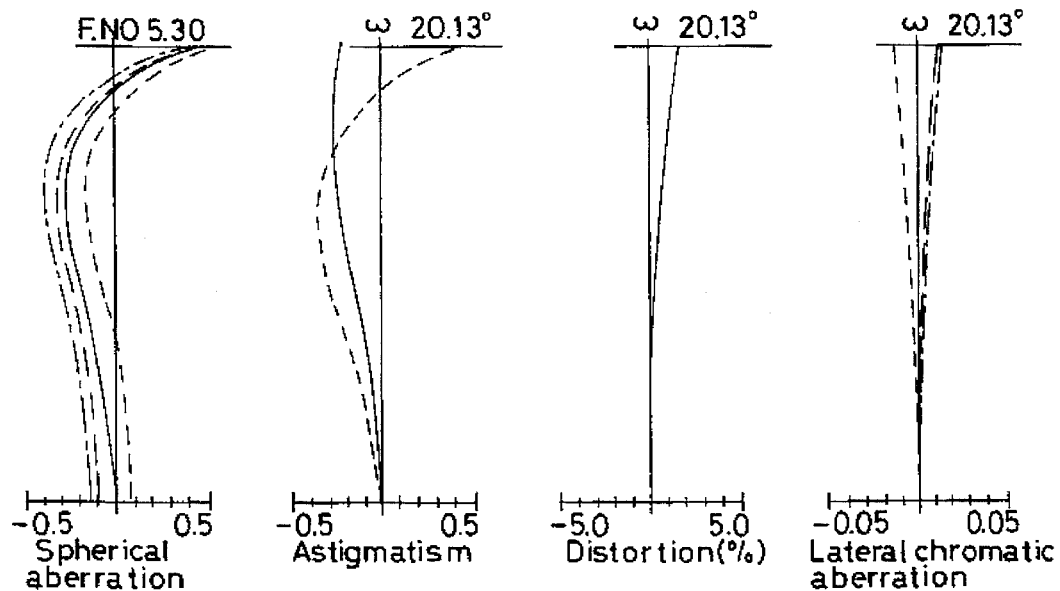
Fig. 9(b)(1) Fig. 9(b)(2) Fig. 9(b)(3) Fig. 9(b)(4)

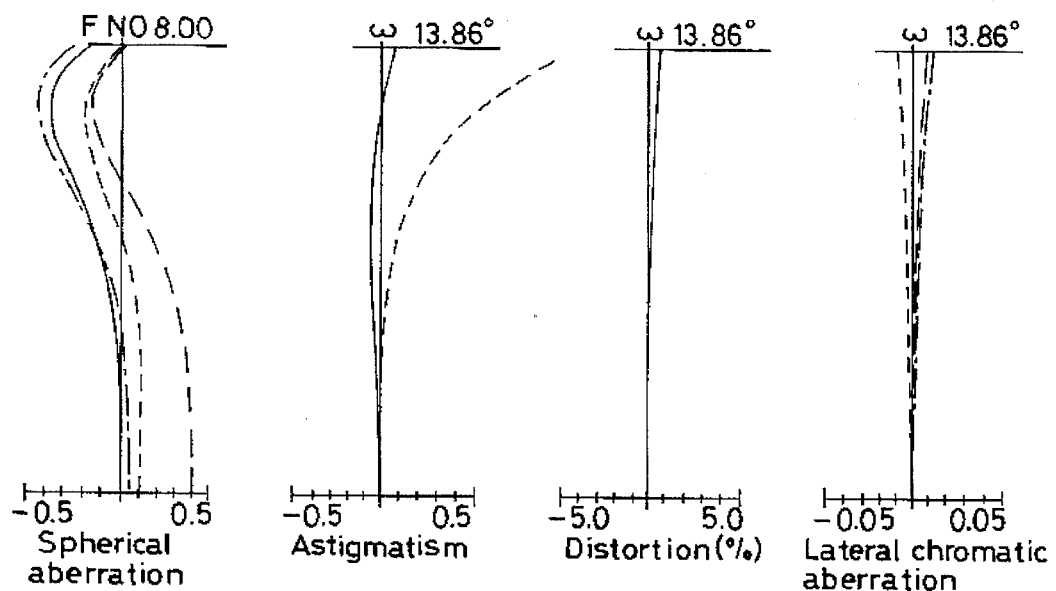

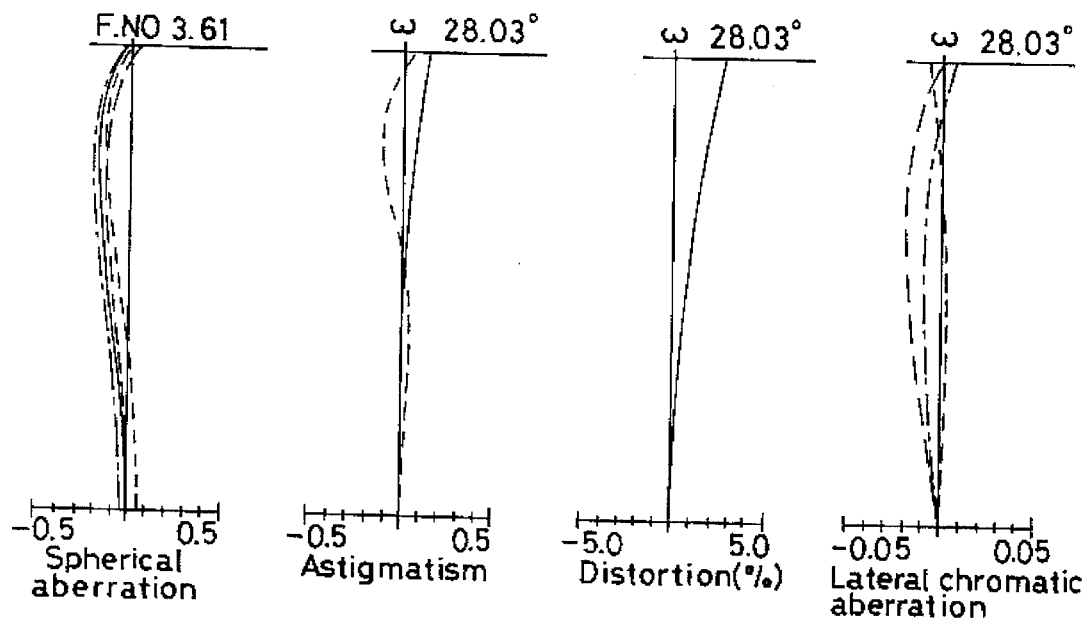
Fig. 10(a)(1)   Fig. 10(a)(2)   Fig. 10(a)(3)   Fig. 10(a)(4)
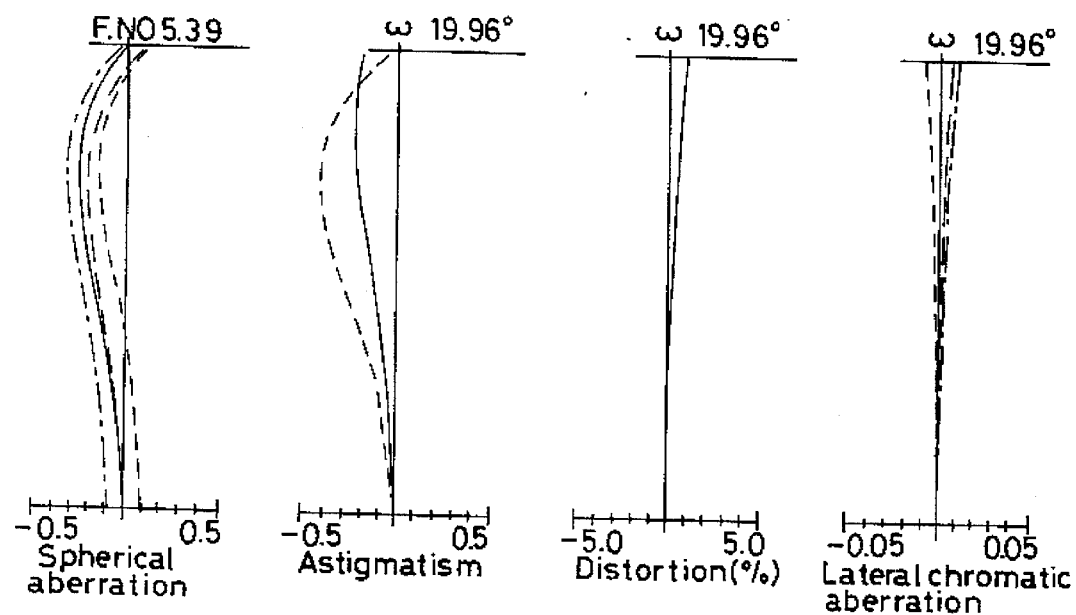
Fig. 10(b)(1)   Fig. 10(b)(2)   Fig. 10(b)(3)   Fig. 10(b)(4)

Fig. 10(c)(1)  Fig. 10(c)(2)  Fig. 10(c)(3)  Fig. 10(c)(4)
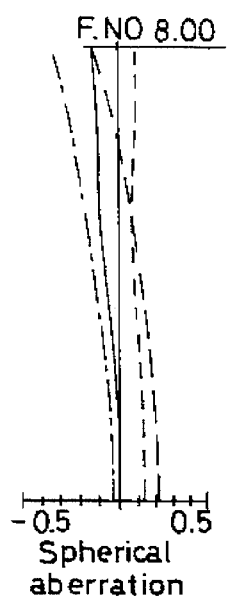
Spherical aberration
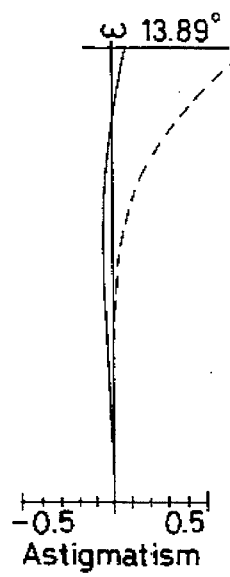
Astigmatism
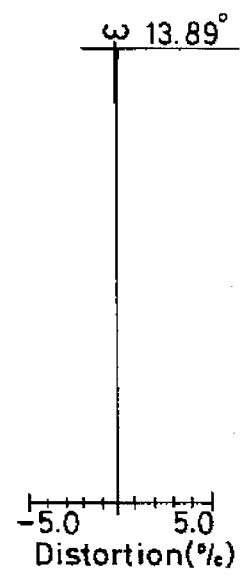
Distortion(%)
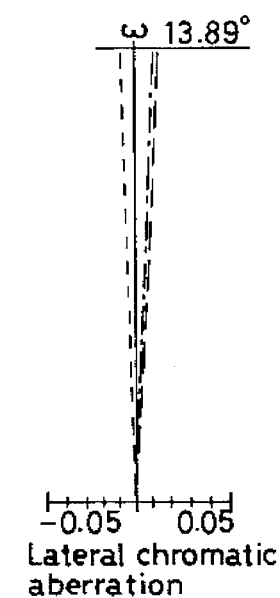
Lateral chromatic aberration

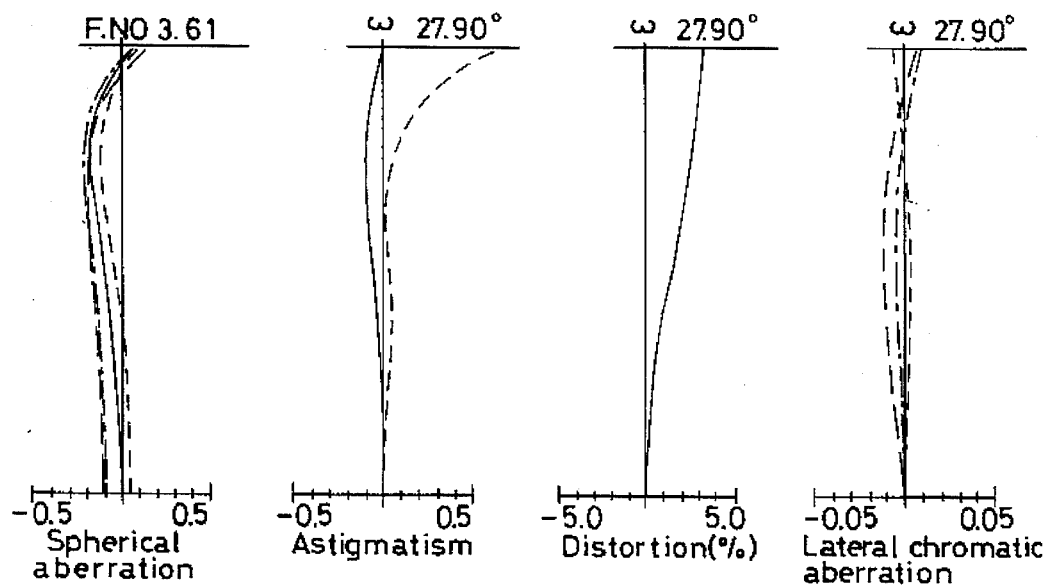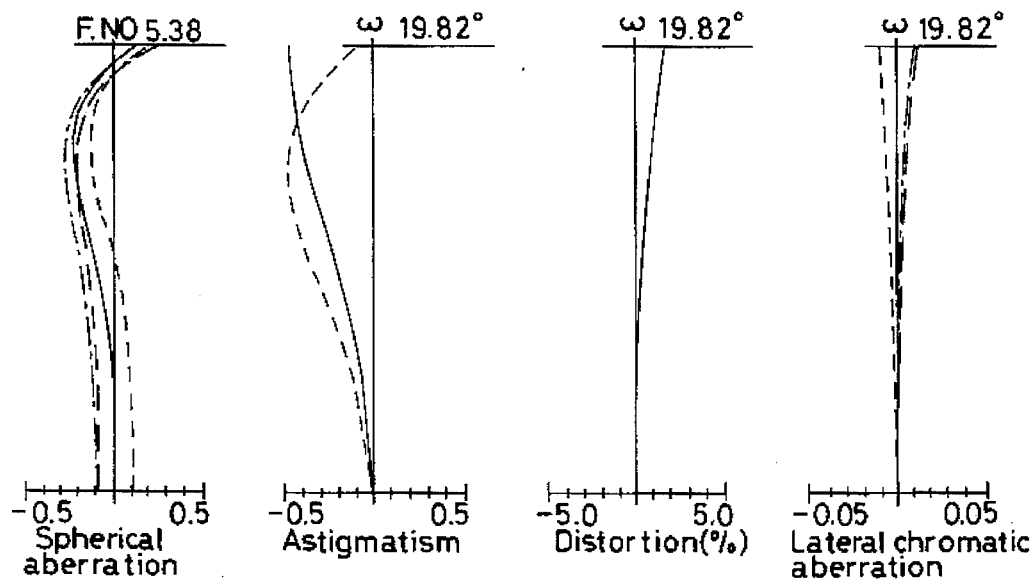

Fig. 11(c)(1)     Fig. 11(c)(2)     Fig. 11(c)(3)     Fig. 11(c)(4)
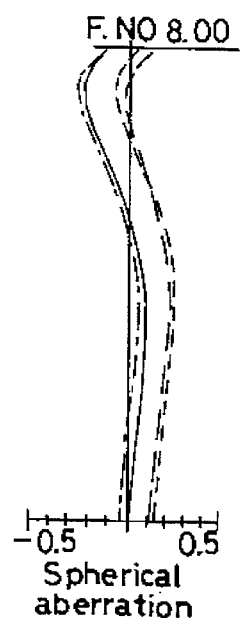
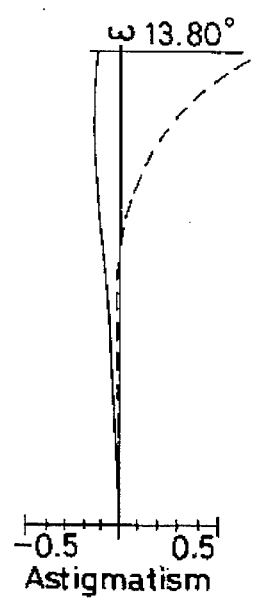
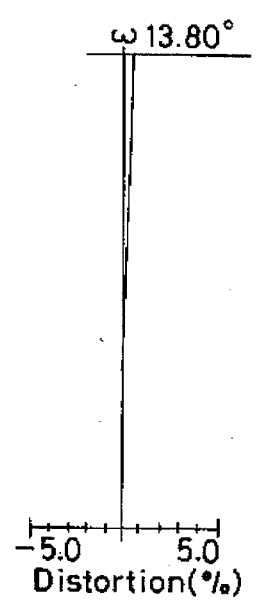
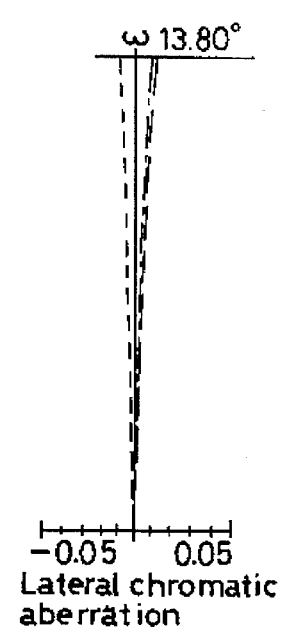

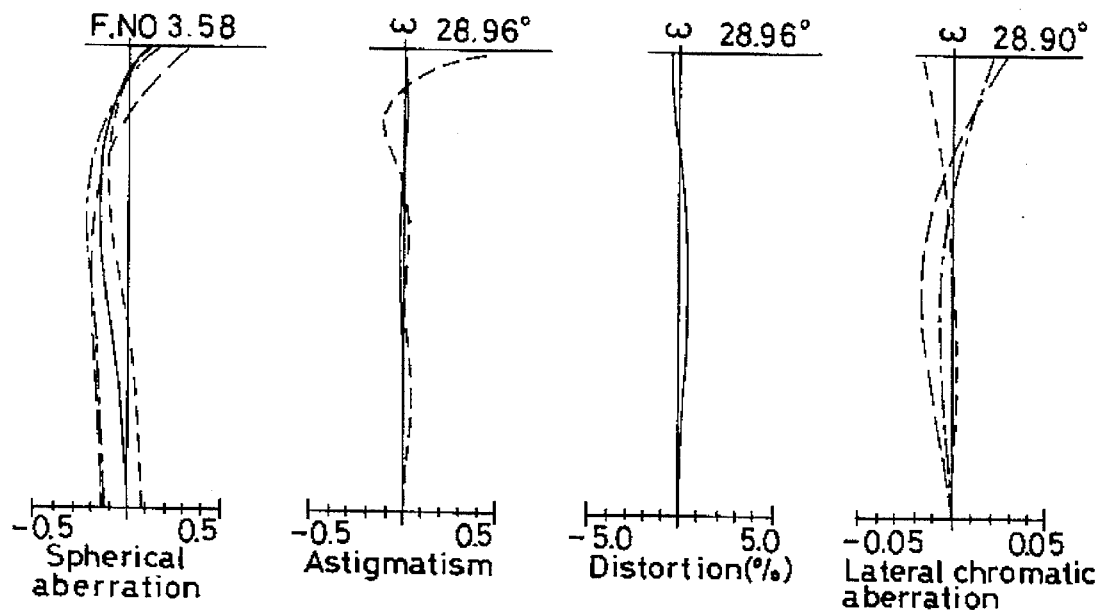
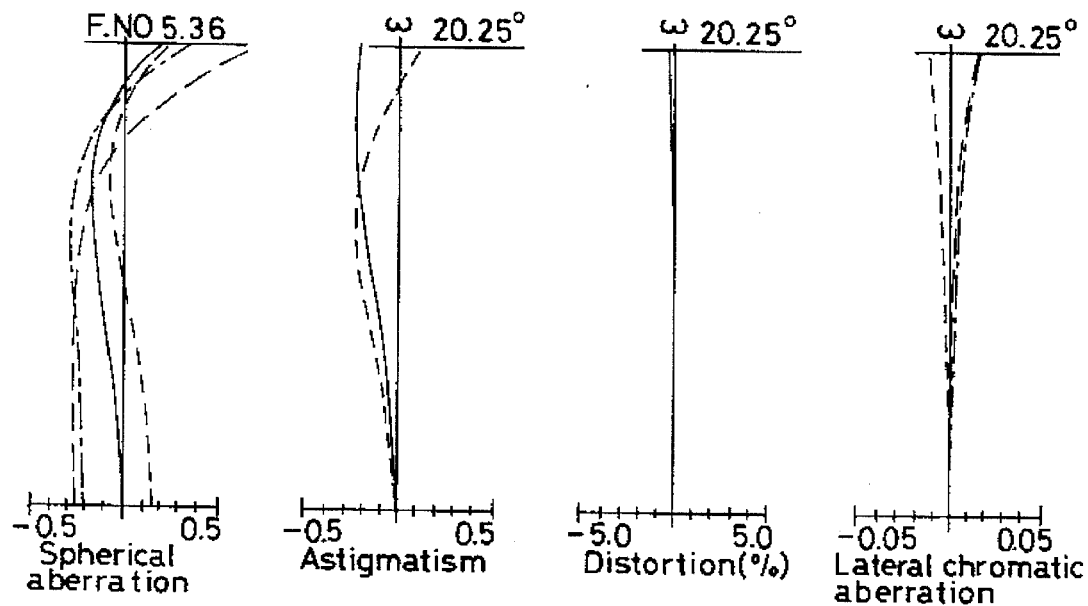

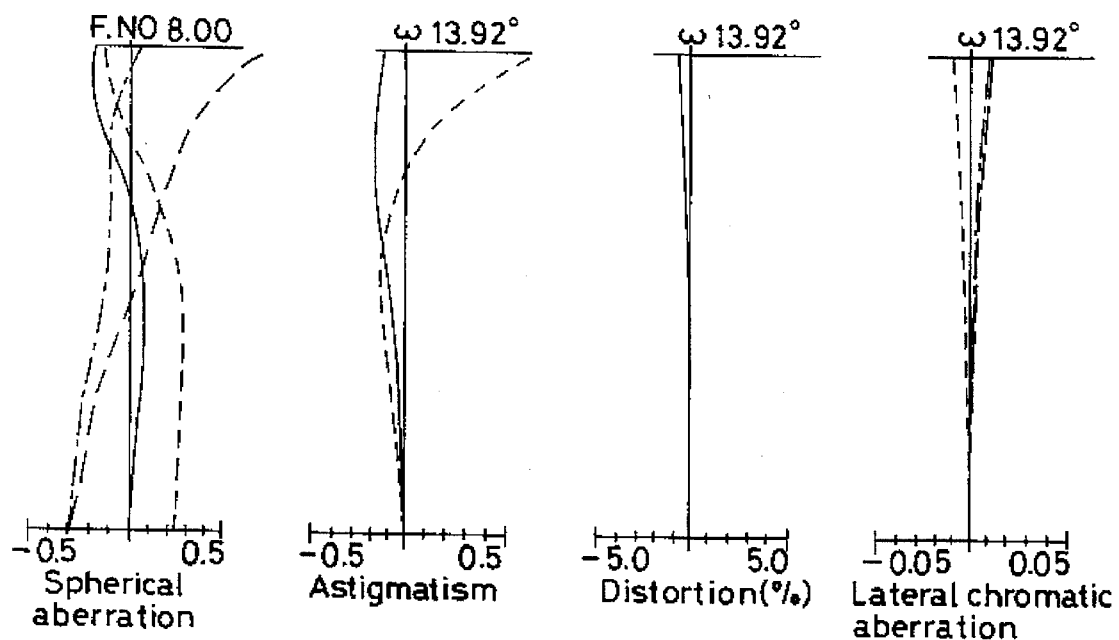

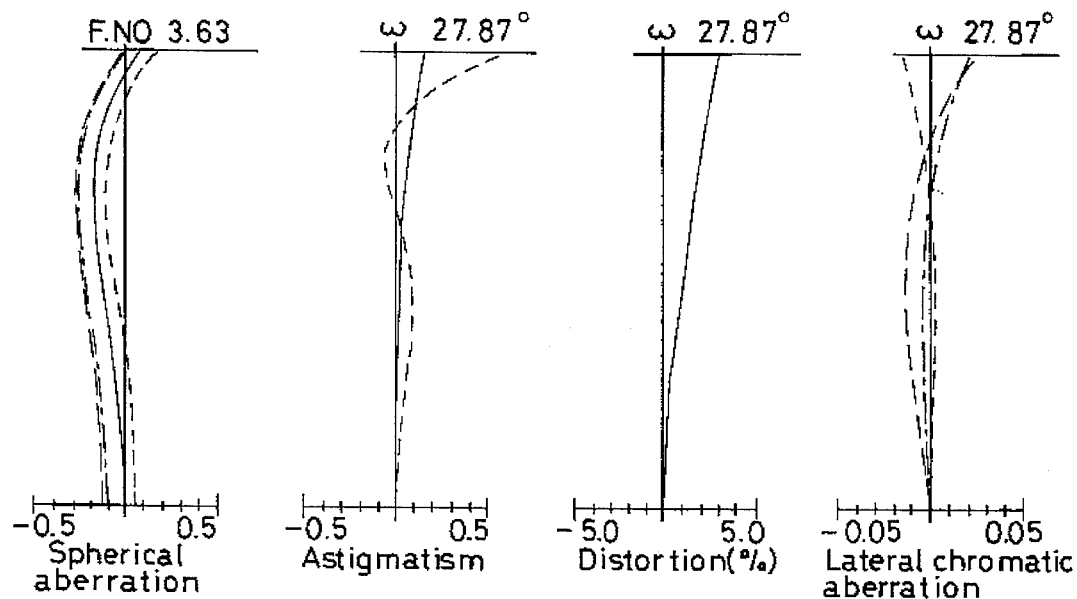
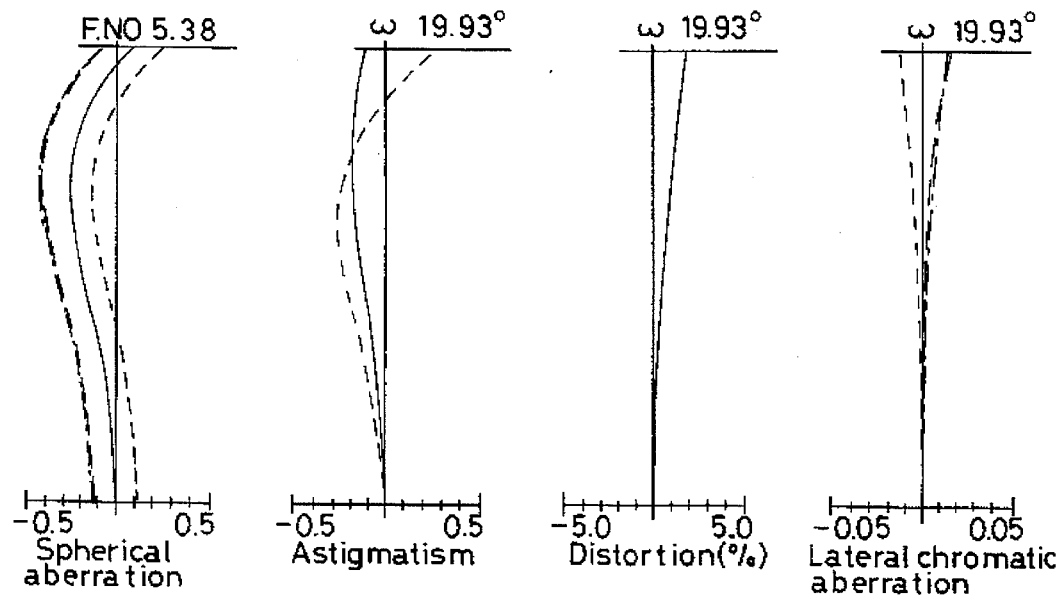

Fig. 13(c)(1)   Fig. 13(c)(2)   Fig. 13(c)(3)   Fig. 13(c)(4)
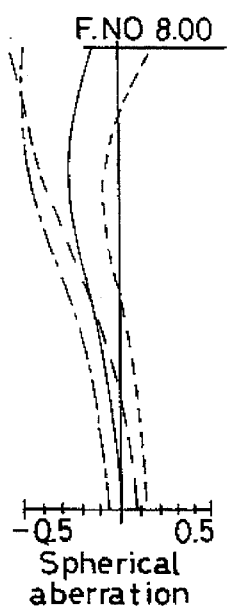
F.NO 8.00
-0.5   0.5
Spherical
aberration
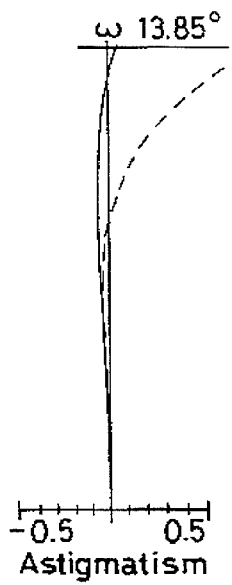
ω 13.85°
-0.5   0.5
Astigmatism
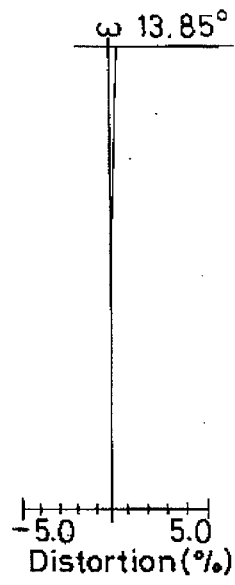
ω 13.85°
-5.0   5.0
Distortion(%)
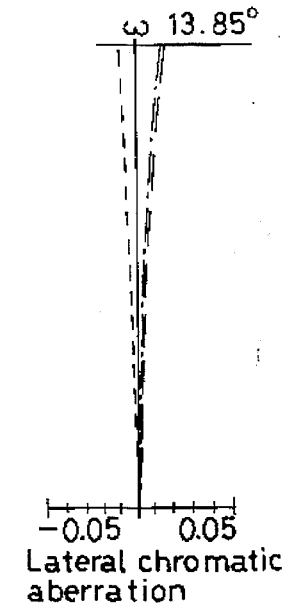
ω 13.85°
-0.05   0.05
Lateral chromatic
aberration Fig. 14(a)(1)  Fig. 14(a)(2)  Fig. 14(a)(3)  Fig. 14(a)(4)
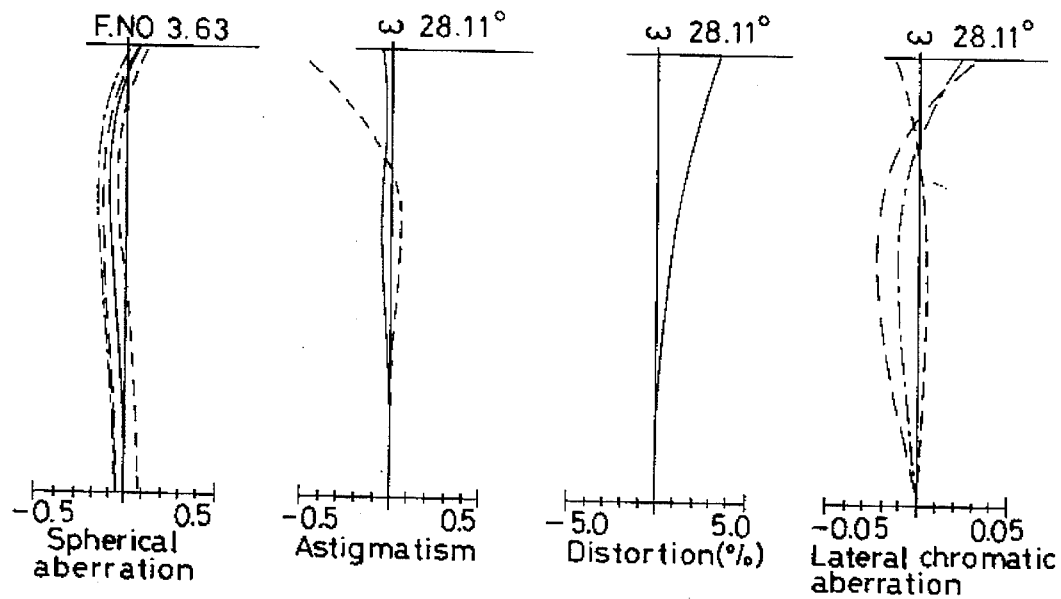
Fig. 14(b)(1)  Fig. 14(b)(2)  Fig. 14(b)(3)  Fig. 14(b)(4)
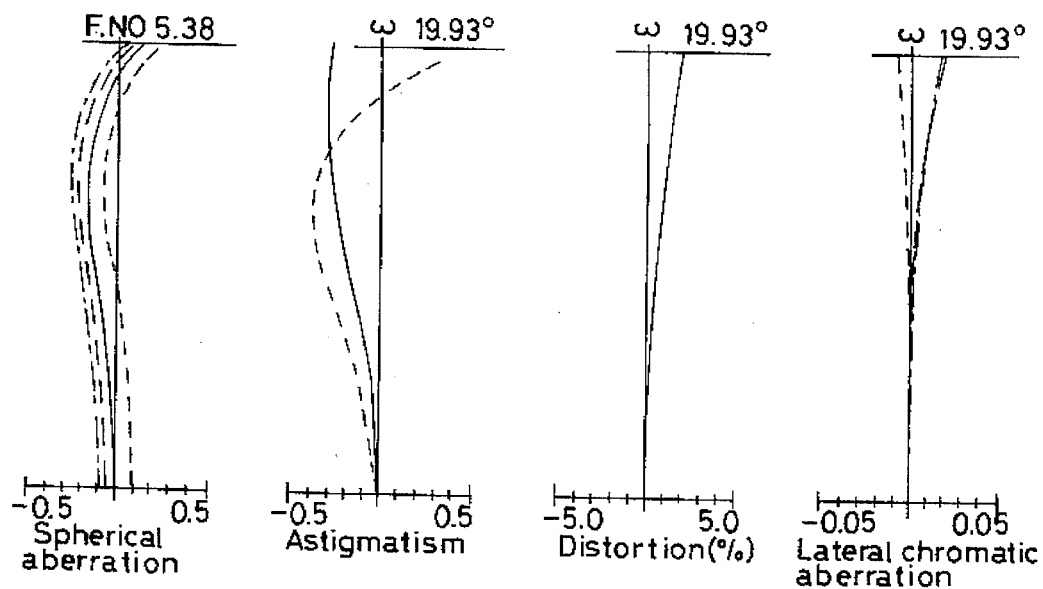

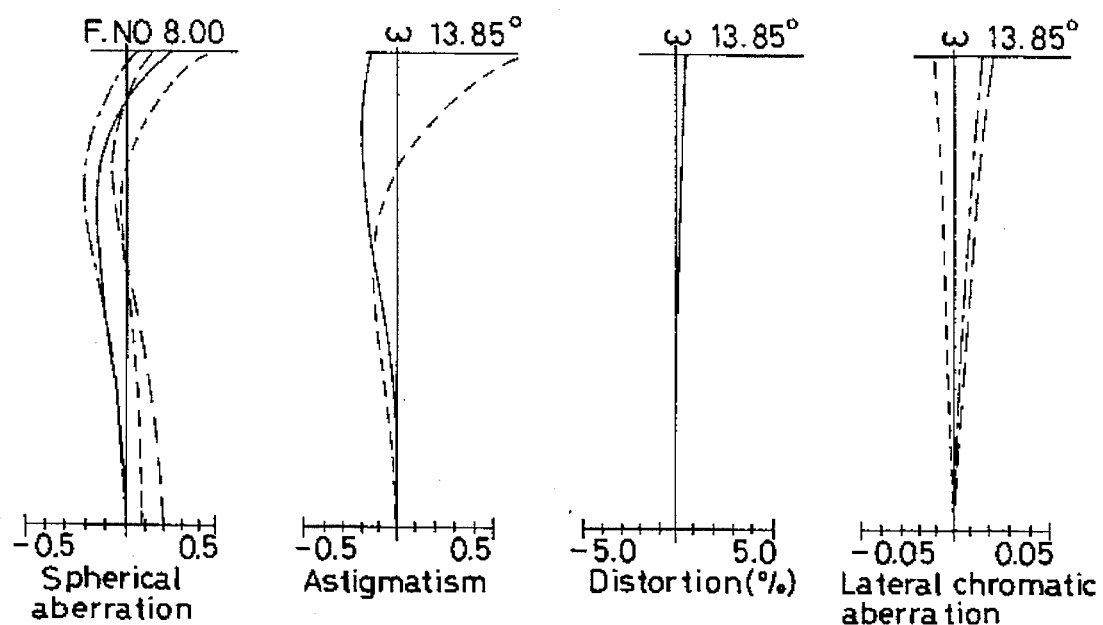

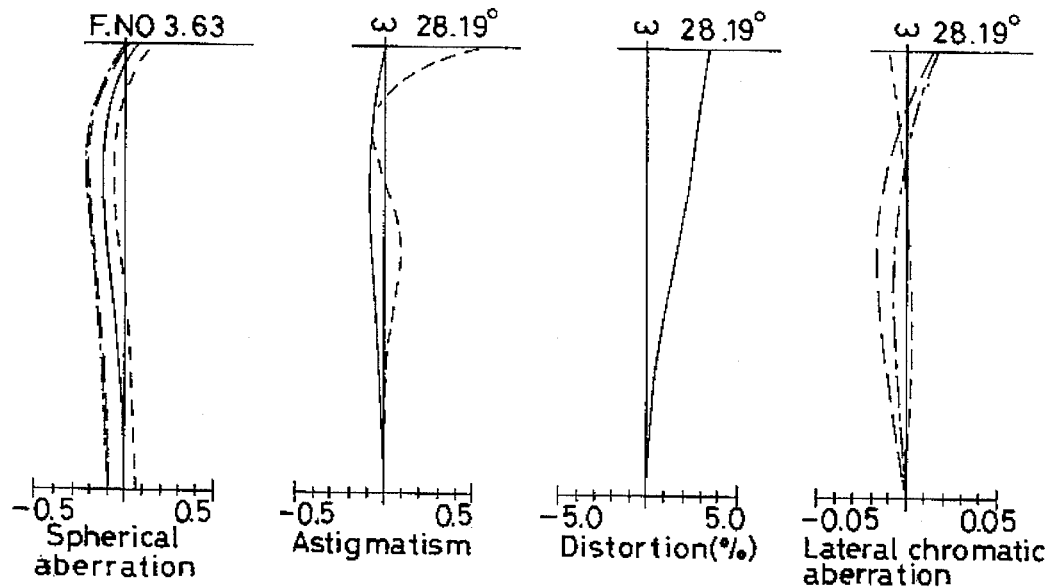
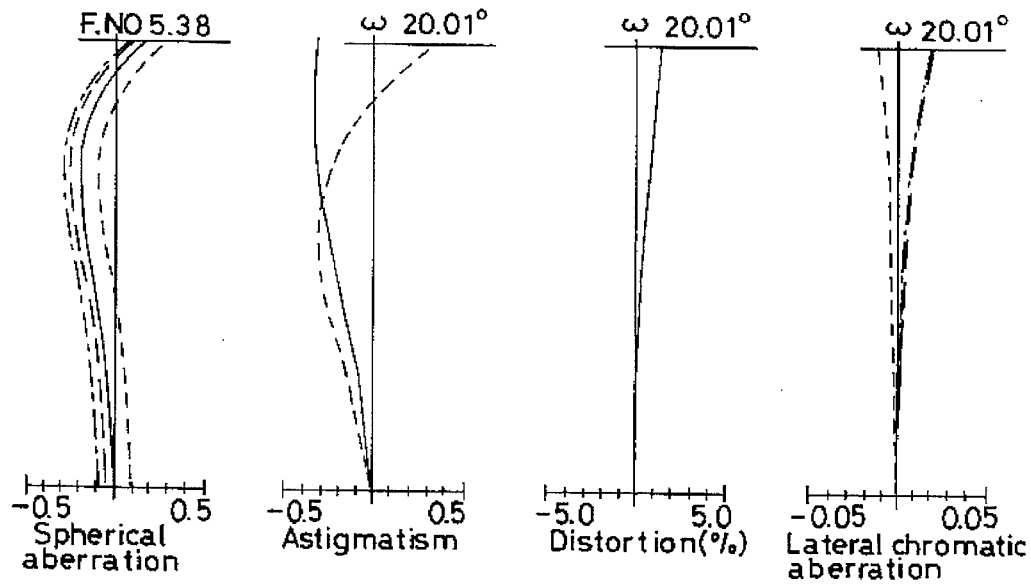

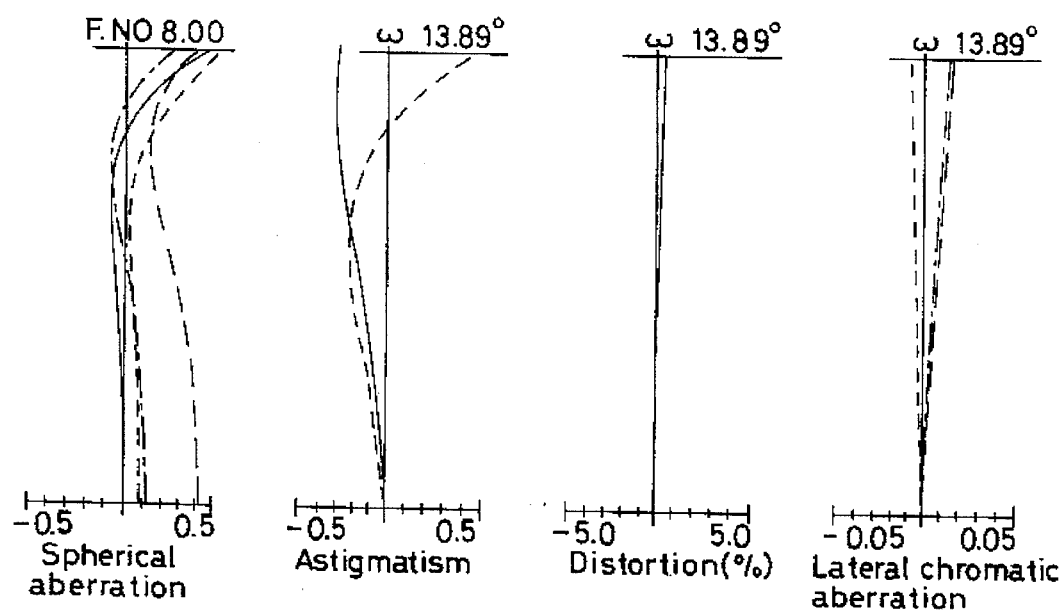

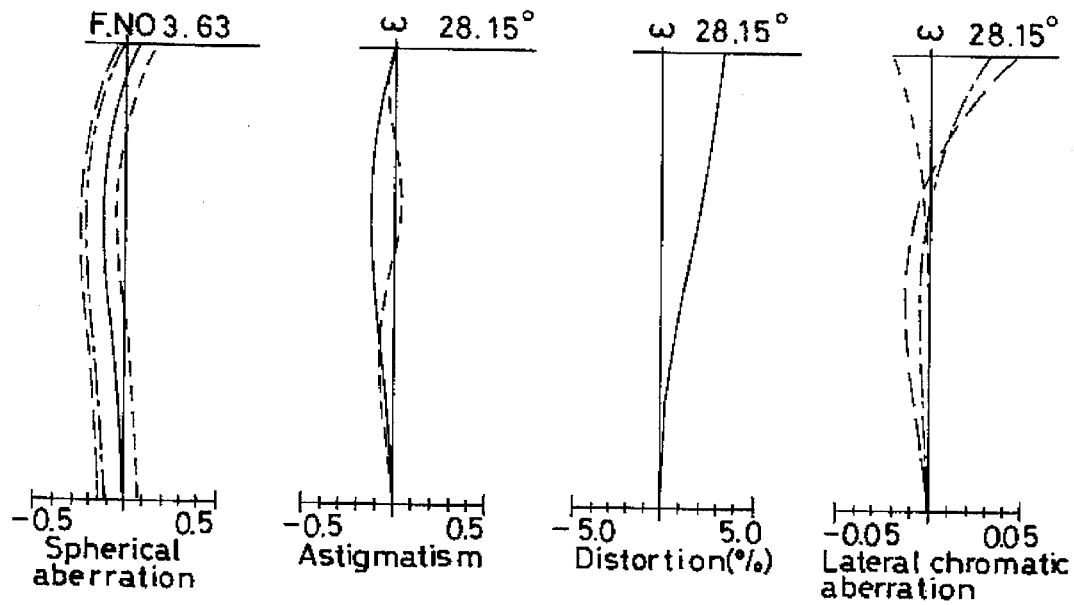
Fig. 16(a)(1)  Fig. 16(a)(2)  Fig. 16(a)(3)  Fig. 16(a)(4)
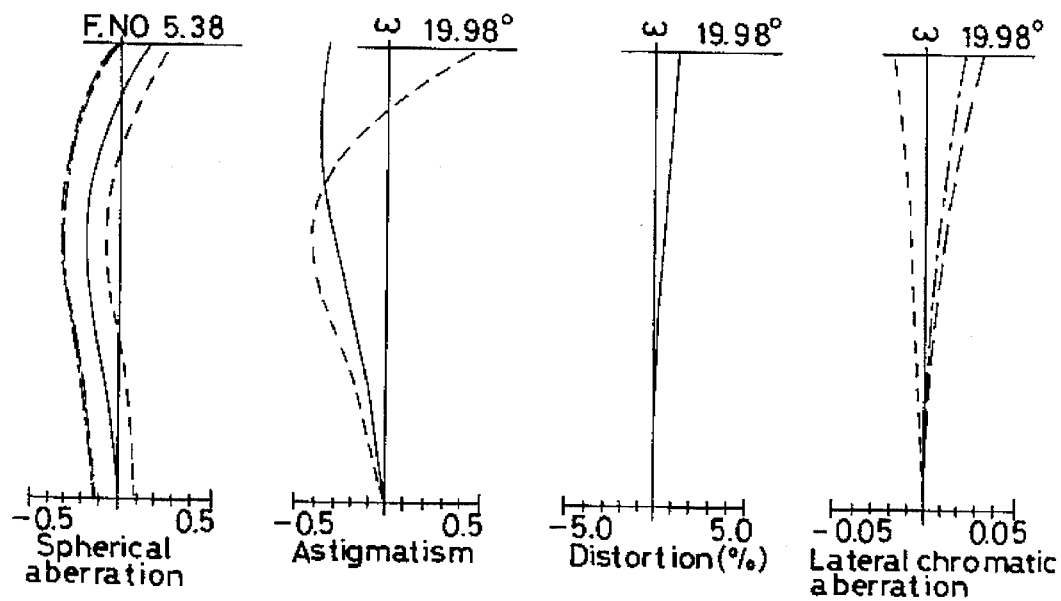
Fig. 16(b)(1)  Fig. 16(b)(2)  Fig. 16(b)(3)  Fig. 16(b)(4)

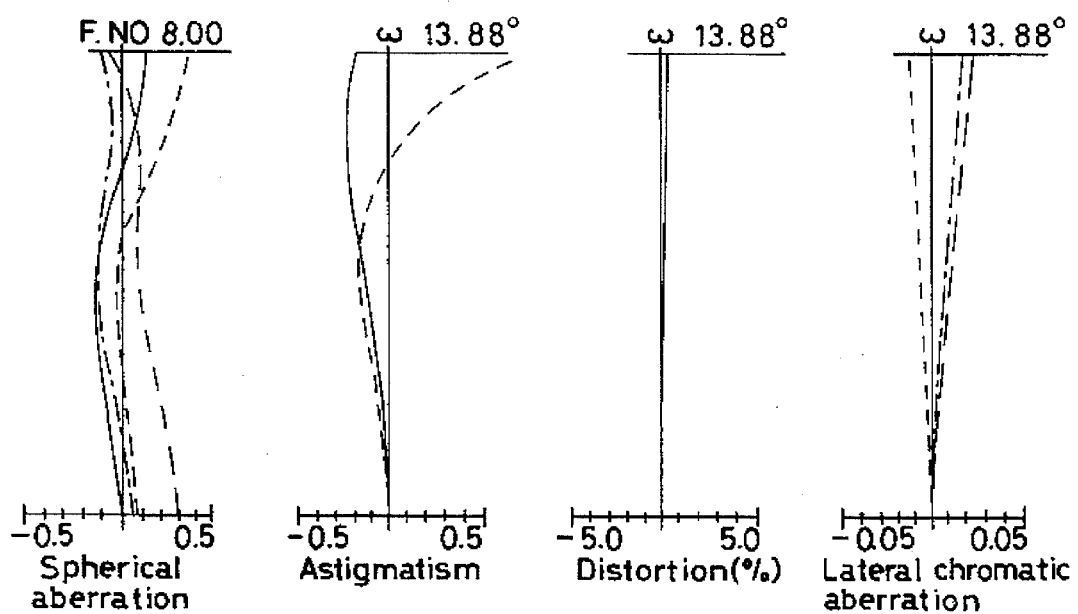

TWO-UNIT ZOOM LENS SYSTEM

BACKGROUND OF THE INVENTION

The present invention relates to a two-unit zoom lens system and, more particularly, to a zoom lens system with a short back focus which is suitable for use with a compact camera or the like and which is composed of five or six lens elements and has a zoom ratio of the order of 2 to 2.5.

With the reduction in the cost of compact cameras, zoom lens systems having a smaller number of constituent lens elements have been proposed in recent years. Prior art whereby the number of constituent lens elements is reduced to four includes Japanese Patent Application Laid-Open (KOKAI) Nos. 3-127008 (1991) and 3-274516 (1991). In the prior zoom lens systems, the 1-st lens unit is composed of a pair of negative and positive lenses, and the 2-nd lens unit is composed of a pair of positive and negative lenses. In the embodiments of these zoom lens systems, many aspherical surfaces are used; most of the embodiments use at least one glass lens having aspherical surfaces on both sides thereof.

Prior art that uses plastic lenses includes Japanese Patent Application Laid-Open (KOKAI) No. 3-116110 (1991). Plastic lenses suffer from the problem that the focal point varies with changes in temperature-humidity conditions. Taking into consideration the problem of plastic lenses, the above-mentioned prior art combines together a pair of positive and negative plastic lenses so as to increase the composite focal length, thereby minimizing the variation of the focal point.

Under these circumstances, the present applicant has proposed a zoom lens system that uses a plastic lens in Japanese Patent Application No. 3-273985 (1991). In the proposed zoom lens system, the 1-st lens unit is composed of a lens of extremely small power, a negative lens and a positive lens.

Japanese Patent Application Laid-Open (KOKAI) No. 4-161914 (1992) discloses a zoom lens system that takes measures to minimize the variation of the focal point with changes in temperature-humidity conditions. In the disclosed lens arrangement, the 1-st lens unit is composed of a positive lens, a negative lens, a lens of small power, and a positive lens, and the zoom ratio is not higher than 2.

Prior zoom lens systems that have about six lens elements and use aspherical surfaces include Japanese Patent Application Laid-Open (KOKAI) Nos. 62-56917 (1987) and 64-42618 (1989). In these zoom lens systems, the 1-st lens unit is composed of a positive lens, a negative lens, a positive lens, and a positive lens, and the zoom ratio is of the order of two. In this case also, aspherical surfaces are used for glass lenses.

If it is intended to reduce the number of constituent lens elements in a zoom lens system for a compact camera, it is necessary to use a large number of aspherical surfaces and double-aspherical glass lenses as in the case of Japanese Patent Application Laid-Open (KOKAI) Nos. 3-127008 and 3-274516. Thus, these prior zoom lens systems are disadvantageous from the viewpoint of reducing the cost. Moreover, the requirement for accuracy is great because decentration of lens elements causes the performance to be degraded.

Even if it is intended to minimize the effect of variation in the focal point by combining a pair of positive and negative plastic lenses so that the composite focal length is increased, if the materials of these lenses are different from each other, the two lenses differ from each other in the tendency for the focal point to vary with changes in temperature-humidity conditions. If a change in configuration of each lens is also taken into consideration, it is extremely difficult to predict a variation of the focal point.

These problems have been solved by Japanese Patent Application No. 3-273985, proposed by the present applicant. In the proposed zoom lens system, however, the zoom ratio is limited to about two.

Even if a lens of small power is disposed in the 1-st lens unit as in the case of Japanese Patent Application Laid-Open (KOKAI) No. 4-161914, the basic arrangement of the 1-st lens unit is comprised of a positive lens, a negative and a positive lens. When the 1-st lens unit has such an arrangement, the power of the negative lens must be intensified in order to correct the Petzval's sum and spherical aberration. Moreover, distortion that is produced by the negative lens must be corrected with positive power. Consequently, the lens power becomes excessively strong, so that coma and astigmatism cannot satisfactorily be corrected. Therefore, the performance does not improve even if an aspherical lens of small power is disposed in the 1-st lens unit.

The above-described matters similarly apply to the arrangement of the 1-st lens unit in a zoom lens system composed of six lens elements and using aspherical surfaces as in the case of Japanese Patent Application Laid-Open (KOKAI) Nos. 62-56917 and 64-42618. That is, the power of the negative lens must be intensified in order to effect aberration correction. Particularly in Japanese Patent Application Laid-Open (KOKAI) No. 62-56917, since the power of the negative lens is excessively strong, the aspherical surface of the first positive lens must be arranged so that the positive power becomes stronger. Thus, since each lens has strong power in this type of zoom lens system, decentration of lens elements causes the performance to be degraded. Therefore, the requirement for assembling accuracy must be strict. In addition, aspherical surfaces are used for glass lenses, which is disadvantageous from the viewpoint of cost. Further, the zoom ratio is two, which is unsatisfactory.

SUMMARY OF THE INVENTION

In view of the above-described circumstances, it is an object of the present invention to provide a two-unit zoom lens system for use with a compact camera, which is an improvement over Japanese Patent Application No. 3-273985, proposed by the present applicant, and which has a zoom ratio of about 2 to 2.5 and is of low cost and high performance.

To attain the above-described object, the present invention first provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a positive lens group, and a stop, and the 2-nd lens unit is composed, in order from the object side, of a positive lens, and a negative lens having an aspherical surface.

Secondly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a positive lens group, and a stop, and the 2-nd lens unit is composed, in order from the object side, of a positive lens, and a negative lens having an aspherical surface on the object side thereof.

Thirdly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface with a convex surface directed toward the object side, and a positive lens group, and the 2-nd lens unit is composed, in order from the object side, of a positive lens, and a negative lens having an aspherical surface on the object side thereof.

Fourthly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface with a concave surface directed toward the object side, a positive lens group, and a stop, and the 2-nd lens unit is composed, in order from the object side, of a positive lens, and a lens having an aspherical surface.

Fifthly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface with a convex surface directed toward the object side, a negative lens, and a positive lens, and the 2-nd lens unit is composed, in order from the object side, of a positive lens, and a negative lens having an aspherical surface.

Sixthly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface with a convex surface directed toward the object side, a negative lens, a positive lens, and a positive lens, and the 2-nd lens unit is composed, in order from the object side, of a positive lens, and a negative lens having an aspherical surface.

Seventhly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a negative lens, a positive lens, and a stop, and the 2-nd lens unit is composed, in order from the object side, of a positive lens, and a negative lens having an aspherical surface.

Eighthly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a negative lens, a positive lens, a positive lens, and a stop, and the 2-nd lens unit is composed, in order from the object side, of a positive lens, and a negative lens having an aspherical surface.

Ninthly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a negative lens, a positive lens, a stop, and a positive lens, and the 2-nd lens unit is composed, in order from the object side, of a positive lens, and a negative lens having an aspherical surface.

Tenthly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a positive lens, and a negative lens, and the 2-nd lens unit is composed, in order from the object side, of a positive lens, and a negative lens having an aspherical surface on the object side thereof.

Eleventhly, the present invention provides a two-unit zoom lens system having, in order from the object side, a 1-st lens unit of positive power, and a 2-nd lens unit of negative power, wherein the 1-st lens unit is composed, in order from the object side, of a lens of extremely small power having an aspherical surface, a cemented lens of a pair of negative and positive lenses, and a positive lens, and the 2-nd lens unit is composed, in order from the object side, of a positive lens, and a negative lens having an aspherical surface.

In the first to eleventh two-unit zoom lens systems of the present invention, it is preferable to satisfy the following condition:

$$0.6 < F_1/f_W < 0.9 \tag{1}$$

where $F_1$ is the focal length of the 1-st lens unit, and $f_W$ is the focal length of the entire system at the wide end.

Further, in the first to eleventh two-unit zoom lens systems of the present invention, it is preferable to satisfy the following condition:

$$0.5 < |F_2|/f_W < 0.9 \tag{2}$$

where $F_2$ is the focal length of the 2-nd lens unit, and $f_W$ is the focal length of the entire system at the wide end.

In the first to eleventh two-unit zoom lens systems of the present invention, the aspherical lens of extremely small power preferably satisfies the following condition:

$$-0.9 < f_T/f_1 < 0.9 \tag{3}$$

where $f_T$ is the focal length of the entire system at the tele end, and $f_1$ is the focal length of the lens in the 1-st lens unit that is the closest to the object side.

Further, in the first to eleventh two-unit zoom lens systems of the present invention, the aspherical lens of extremely small power preferably has such an aspherical configuration that the negative power becomes stronger as the distance from the optical axis of the lens system increases toward the periphery thereof.

Further, in the first to eleventh two-unit zoom lens systems of the present invention, the aspherical lens of extremely small power preferably satisfies the following condition:

$$-0.4 < f_T/f_1 < 0.4 \tag{3'}$$

where $f_T$ is the focal length of the entire system at the tele end, and $f_1$ is the focal length of the lens in the 1-st lens unit that is the closest to the object side.

The reason for adopting the above-described arrangements and the functions thereof will be explained below.

The zoom lens system disclosed in Japanese Patent Application No. 3-273985 by the present applicant has a 1-st lens unit of positive power which is composed, in order from the object side, of a lens of extremely small power, a negative lens, and a positive lens, thereby minimizing the variation of the focal length of the plastic lens caused by changes in temperature-humidity conditions, and thus realizing excellent performance at a reduced cost and with a compact structure. However, as the zoom ratio is increased, chromatic aberration, astigmatism and comatic aberration are produced in the 2-nd lens unit. The reason for this is as follows: Since chromatic aberration is corrected by a combination of positive and negative lenses, when the power of the positive lens is increased, the power of the negative lens must also be increased in order to minimize the overall length of the lens system. Consequently, it becomes impossible to obtain good balance between the positive power and the negative power at the periphery, and hence it becomes difficult to correct astigmatism and comatic aberration.

Therefore, in the present invention, an aspherical surface is used for the negative lens in the 2-nd lens unit to obtain good balance between the positive power and the negative power at the periphery, thereby enabling the above-described various aberrations to be satisfactorily corrected.

Thus, the zoom lens system of the present invention not only provides a zoom ratio of 2 to 2.5 but also achieves a reduction in the cost and exhibits high performance.

The zoom lens system of the present invention will be further explained below with reference to FIG. 1, which is a sectional view showing the lens system in three different positions, that is, the wide end, the standard position, and the tele end. It is assumed that a first lens L1 is a lens of extremely small power having an aspherical surface; a second lens L2 and a third lens L3 constitute a positive lens group; a fourth lens L4 is a positive lens; and a fifth lens L5 is a negative lens having an aspherical surface. Further, it is assumed that the first to third lenses L1 to L3 constitute a 1-st lens unit G1 of positive power, and the fourth and fifth lenses L4 and L5 constitute a 2-nd lens unit G2 of negative power.

To achieve an even more compact structure and higher performance for the zoom lens system of the present invention, it is preferable to satisfy the following conditions (1) to (6):

$$0.6 < F_1/f_W < 0.9 \quad (1)$$

where $F_1$ is the focal length of the 1-st lens unit G1, and $f_W$ is the focal length of the entire system at the wide end.

The condition (1) relates to the focal length of the 1-st lens unit G1. If the upper limit of the condition (1) is exceeded, i.e., if $F_1/f_W$ is not smaller than 0.9, the back focus shortens, and the diameter of the final lens increases. As a result, it becomes likely that an image of dust attached to the final lens surface will be taken and formed on the film, and that flare will be caused by reflection at the film surface. If the lower limit of the condition (1) is not reached, i.e., if $F_1/f_W$ is not larger than 0.6, the power of the 1-st lens unit G1 becomes excessively strong, making it impossible to correct aberrations satisfactorily.

$$0.5 < |F_2|/f_W < 0.9 \quad (2)$$

where $F_2$ is the focal length of the 2-nd lens unit G2.

The condition (2) relates to the focal length of the 2-nd lens unit G2. If the upper limit of the condition (2) is exceeded, i.e., if $|F_2|/f_W$ is not smaller than 0.9, the power of the 2-nd lens unit G2 becomes excessively weak. As a result, the amount of lens movement increases, which invites an increase in the overall length of the lens system. If the lower limit of the condition (2) is not reached, i.e, if $|F_2|/f_W$ is not larger than 0.5, the power of the 2-nd lens unit G2 becomes excessively strong, making it impossible to correct aberrations satisfactorily.

Since the first lens L1 is a plastic lens, if the power thereof increases, there will be variation of the focal point with changes in temperature-humidity conditions. Accordingly, it is preferable to satisfy the following condition:

$$-0.9 < f_T/f_1 < 0.9 \quad (3)$$

where $f_T$ is the focal length of the entire system at the tele end, and $f_1$ is the focal length of the first lens L1.

If the upper limit of the condition (3) is exceeded or the lower limit thereof is not reached, i.e., if $f_T/f_1$ is not smaller than 0.9 or not larger than −0.9, it becomes impossible to ignore the variation of the focal point of the plastic lens. With regard to the condition (3), it is even more preferable to satisfy the following condition:

$$-0.4 < f_T/f_1 < 0.4 \quad (3')$$

Further, it is preferable for the first lens L1 to have such an aspherical configuration that the negative power becomes stronger as the distance from the optical axis of the lens system increases toward the periphery thereof. The first lens L1 may have aspherical surfaces on both sides thereof.

The second and third lenses L2 and L3, which form a positive lens group, are preferably composed of as small a number of lens elements as possible with a view to attaining a reduction in the cost. Therefore, if the positive lens group is formed by disposing, in order from the object side, a negative lens and a positive lens, or a positive lens and a negative lens, it is possible to effect favorable aberration correction at a reduced cost.

If negative and positive lenses are used for the second and third lenses L2 and L3, respectively, the principal point of the 1-st lens unit G1 shifts toward the image side. It is, therefore, an effective way of reducing the overall length of the lens system.

If positive and negative lenses are used for the second and third lenses L2 and L3, respectively, distortion and coma produced in the second lens L2 can be corrected by the third lens L3. Thus, the performance improves.

The second and third lenses L2 and L3 may be combined together in the form of a cemented lens. In such a case, the chromatic aberration correcting effect is enhanced. In addition, since these parts are integrated into one, a smoother assembling process can be attained.

With regard to the third lens L3, the positive power thereof may be distributed to two lenses L31 and L32 (Examples 7 to 10). In such a case, the positive power of each lens is small, and aberration also decreases. Accordingly, higher performance can be attained. However, since two positive lenses are used, there is a need for a negative lens or a correcting device that produces negative lens effect. If the power of the second lens L2 is intensified to effect the required correction, it causes various aberrations to occur as has been described above in connection with the problems which are to be solved by the present invention. Therefore, when the third lens L3 is divided into two lens components, it is preferable for the second lens L2 to satisfy the following condition so that the correction is made by the aspherical surface of the first lens L1:

$$0.09 > (R_f + R_r)/(R_f - R_r) > 1 \quad (4)$$

where $R_f$ is the radius of curvature of the object-side surface of the second lens L2, and $R_r$ is the radius of curvature of the image-side surface of the second lens L2.

If the upper limit of the condition (4), i.e., 1, is exceeded, the amount of aspherical surface of the first lens L1 increases, making it difficult to process the aspherical surface. If the lower limit of the condition (4), i.e., 0.09, is not reached, the power of the second lens L2 becomes excessively strong, causing the performance to be degraded.

The second lens L2 and the object-side divided lens L31 of the third lens L3 may be combined together in the form of a cemented lens for the same reason as the above.

The fourth and fifth lenses L4 and L5 are formed by using a positive lens and a negative lens, respectively, as described above. The aspherical surface of the negative lens is preferably shaped so that the negative power becomes weaker as the distance from the optical axis of the lens system increases toward the periphery thereof. With this arrangement, it is possible to correct not only chromatic aberration but also marginal comatic aberration. In this case, the aspherical surface of the fifth lens L5 preferably satisfies the following condition:

$$1.0 \times 10^{-3} \leq |\Delta X|/f_W \leq 8.0 \times 10^{-2} \qquad (5)$$

where $|\Delta X|$ is the amount of aspherical surface of the fifth lens L5 from the paraxial curvature radius at the effective aperture.

If the upper limit of the condition (5), i.e., $8.0 \times 10^{-2}$, is exceeded, the power of the fourth lens L4 becomes excessively strong, so that a considerably large amount of coma and astigmatism remains uncorrected when chromatic aberration is corrected. If the lower limit of the condition (5), i.e., $1.0 \times 10^{-3}$, is not reached, the power of the positive lens becomes weak, so that chromatic aberration remains uncorrected when coma and astigmatism are corrected. Therefore, it is not preferable for $|\Delta X|/f_W$ to fall outside the range defined by the condition (5).

with a view to effectively correcting distortion and astigmatism, it is preferable for the fourth lens L4 to be a positive lens having a concave surface directed toward the object side.

With regard to the Abbe's numbers of the fourth and fifth lenses L4 and L5, it is preferable to satisfy the following condition:

$$4.0 < \gamma_{dL5} - \nu_{dLA} < 30.0 \qquad (6)$$

where $\gamma_{dLA}$ is the Abbe's number of the fourth lens L4, and $d_{L5}$ is the Abbe's number of the fifth lens L5.

If the upper limit of the condition (6) is exceeded, i.e., if $\gamma_{dL5} - \gamma_{dLA}$ is not smaller than 30.0, the variation of lateral chromatic aberration increases in zooming from the wide end toward the tele end. If the lower limit of the condition (6) is not reached, i.e., if $\gamma_{dL5} - \gamma_{dLA}$ is not larger than 4.0, the variation of axial chromatic aberration increases in zooming from the wide end toward the tele end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7(a) to 7(c)(4) graphically show spherical aberration, astigmatism, distortion and lateral chromatic aberration at the wide end in FIGS. 7(a)(1) to 7(a)(4), the standard position in FIGS. 7(b) to 7(b)(4), and the tele end in FIGS. 7(c)(1) to 7(c)(4) in Example 1.

FIGS. 8(a)(1) to 8(c)(4) graphically show various aberrations in Example 2 in a similar manner to FIGS. 7(a)(1) to 7(c)(4).

FIGS. 9(a)(1) to 9(c)(4) graphically shows various aberrations in Example 3 in a similar manner to FIGS. 7(a)(1) to 7(c)(4).

FIGS. 10(a)(1) to 10(c)(4) graphically shows various aberrations in Example 4 in a similar manner to FIGS. 7(a)(1) to 7(c)(4).

FIGS. 11(a)(1) to 11(i c)(4 ) graphically shows various aberrations in Example 5 in a similar manner to FIGS. 7(a)(1) to 7(c)(4).

FIGS. 12(a)(1) to 12(c)(4) graphically shows various aberrations in Example 6 in a similar manner to FIGS. 7(a)(1) to 7(c)(4).

FIGS. 13(a)(1) to 13(c)(4) graphically shows various aberrations in Example 7 in a similar manner to FIGS. 7(a)(1) to 7(c)(4).

FIGS. 14(a)(1) to 14(c)(4) graphically shows various aberrations in Example 8 in a similar manner to FIGS. 7(a)(1) to 7(c)(4).

FIGS. 15(a)(1) to 15(c)(4) graphically shows various aberrations in Example 9 in a similar manner to FIGS. 7(a)(1) to 7(c)(4).

FIGS. 16(a)(1) to 16(c)(4) graphically shows various aberrations in Example 10 in a similar manner to FIGS. 7(a)(1) to 7(c)(4).

DESCRIPTION OF THE PREFERRED EMBODIMENTS

Examples 1 to 10 of the two-unit zoom lens system according to the present invention will be described below.

Examples 1 to 5 are two-unit zoom lens systems having a 1-st lens unit G1 of positive power and a 2-nd lens unit of negative power. During zooming from the wide end toward the tele end, the 1-st and 2-nd lens units G1 and G2 move toward the object side while reducing the spacing therebetween. In these Examples, the 1-st lens unit G1 is composed, in order from the object side, of a lens L1 of extremely small power, a negative lens L2, and a positive lens L3, and the 2-nd lens unit G2 is composed, in order from the object side, of a positive lens L4 and a negative lens L5 having an aspherical surface. Although the first and fifth lenses L1 and L5 have aspherical surfaces in these Examples, aspherical surfaces may be used for other lens elements.

Figure 1:
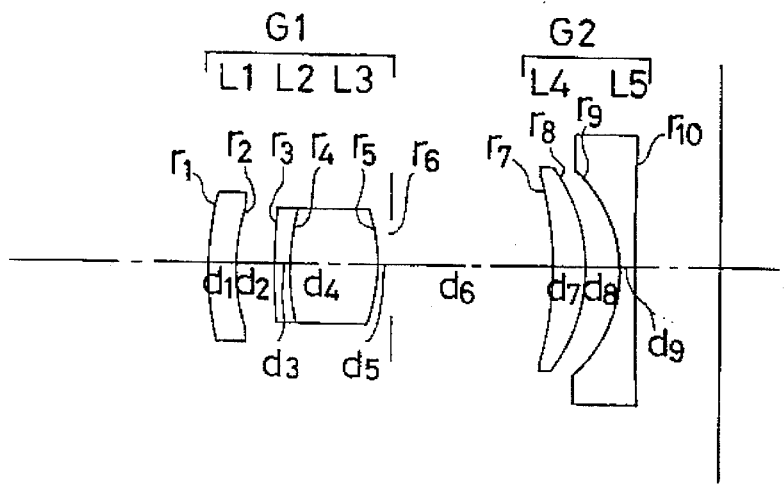
FIGS. 1(a) to 1(c) are is a sectional view showing Example 1 of the two-unit zoom lens system according to the present invention in three different positions, that is, the wide end in FIG. 1(a), the standard position in FIG.(b), and the tele end in FIG.(c).
Figure 1:
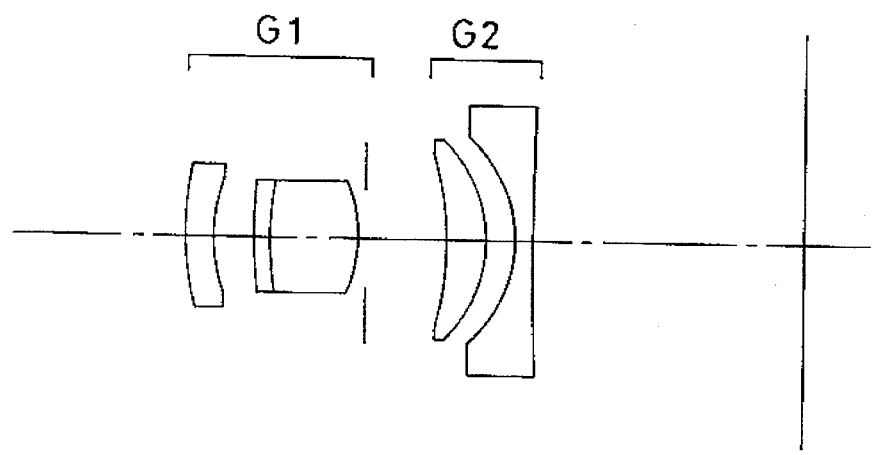
Figure 1:
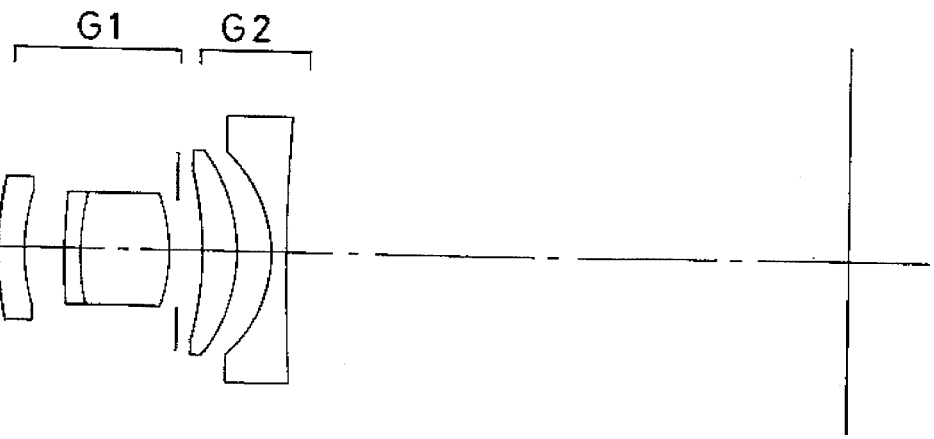

As shown in FIGS. 1(a) to 1(c), which is a sectional view showing the lens arrangement of Example 1 in three different positions, that is, the wide end in FIG. 1(a), the standard position in FIG. 1(b), and the tele end in FIG. 1(c), Example 1 includes a meniscus lens L1 of weak power having a convex surface directed toward the object side, a negative meniscus lens L2 having a convex surface directed toward the object side, a biconvex lens L3, a stop, a positive meniscus lens L4 having a convex surface directed toward the image side, and a biconcave negative lens L5. The second and third lenses L2 and L3 are cemented together. Aspherical surfaces are used for the object-side surface of the first lens L1 and the object-side surface of the fifth lens L5. In addition, an aspherical surface is used for the image-side surface of the fourth lens L4 to reduce the variation of astigmatism.

Figure 2:
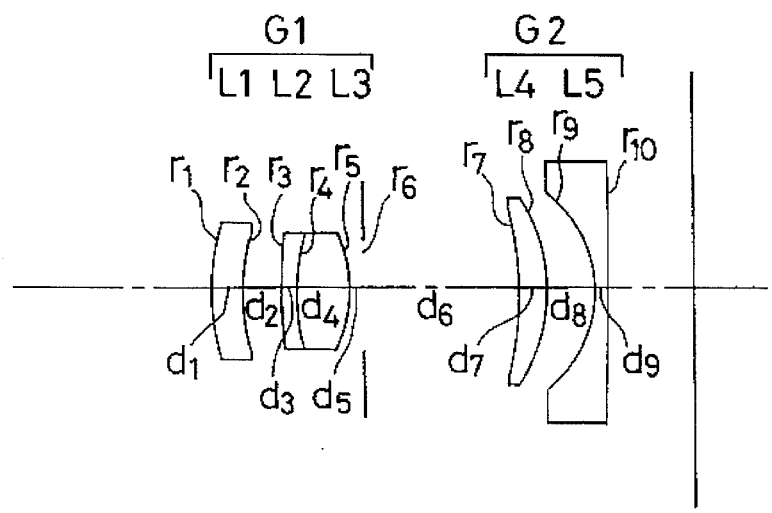
FIGS. 2(a) to 2(c) are a sectional view showing Example 2 of the two-unit zoom lens system according to the present invention in a similar manner to FIGS. 1(a) to 1(c).
Figure 2:
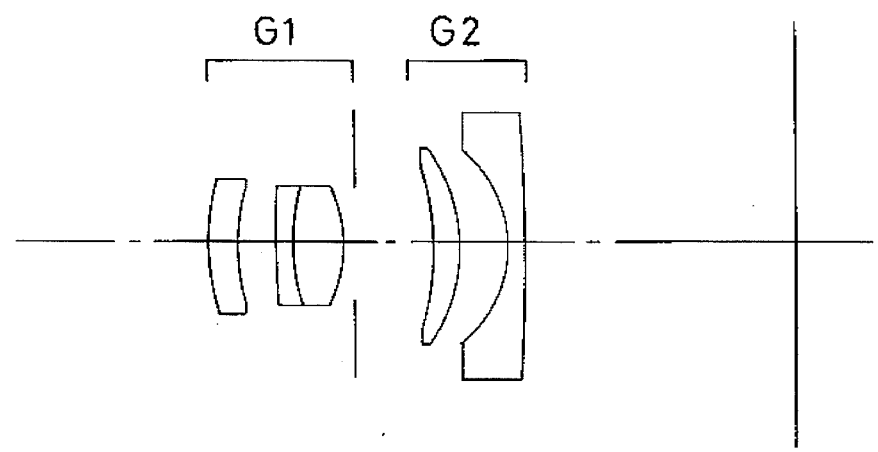
Figure 2:
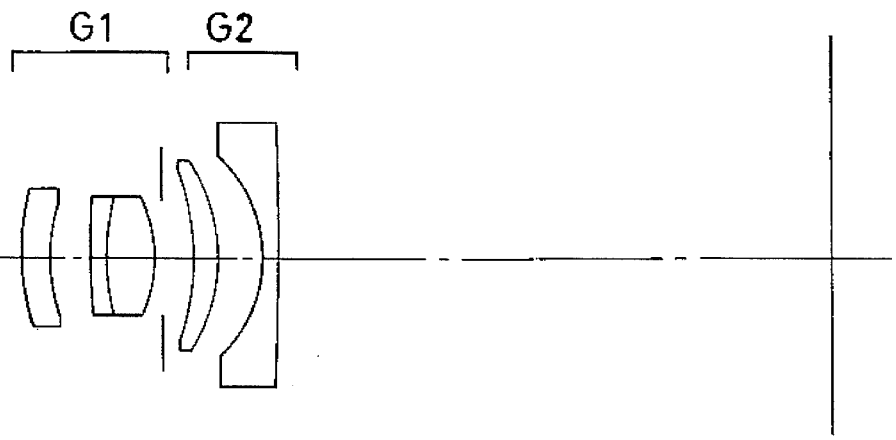

As shown in FIGS. 2(a) to 2(c), which is a sectional view similar to FIGS. 1(a) to 1(c), Example 2 includes a meniscus lens L1 of weak power having a convex surface directed toward the object side, a negative meniscus lens L2 having a convex surface directed toward the object side, a biconvex lens L3, a stop, a positive meniscus lens L4 having a convex surface directed toward the image side, and a negative meniscus lens L5 having a convex surface directed toward the image side. The second and third lenses L2 and L3 are cemented together. Aspherical surfaces are used for the object-side surface of the first lens L1 and the object-side surface of the fifth lens L5. In addition, an aspherical surface is used for the image-side surface of the third lens L3, which has strong power, thereby minimizing the occurrence of spherical aberration.

Example 3 has a lens arrangement approximately similar to that of the Example 2. Aspherical surfaces are used for the object-side surface of the first lens L1 and the object-side surface of the fifth lens L5. In addition, an aspherical surface is used for the object-side surface of the fourth lens L4 to minimize the occurrence of aberrations, mainly comatic aberration.

Example 4 has a lens arrangement approximately similar to that of Example 1. Aspherical surfacers are used for only two surfaces, that is, the object-side surface of the first lens L1, and the object-side surface of the fifth lens L5. Basically, satisfactory performance can be obtained with two aspherical surfaces.

Example 5 has a lens arrangement approximately similar to that of Example 2. Aspherical surfaces are used for the object-side surface of the first lens L1 and the object-side surface of the fifth lens L5. In addition, an aspherical surface is used for the image-side surface of the first lens L1 to correct astigmatism and spherical aberration.

Figure 3:
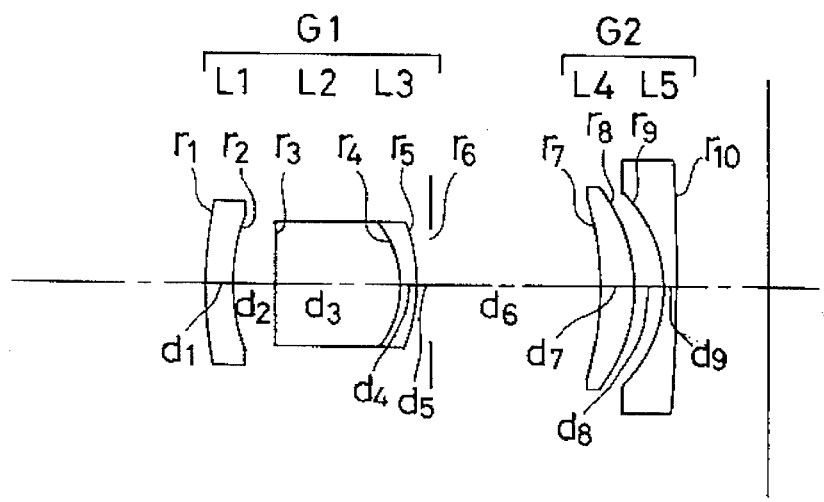
FIGS. 3(a) to 3(c) are a sectional view showing Example 6 of the two-unit zoom lens system according to the present invention in a similar manner to FIGS. 1(a) to 1(c).
Figure 3:
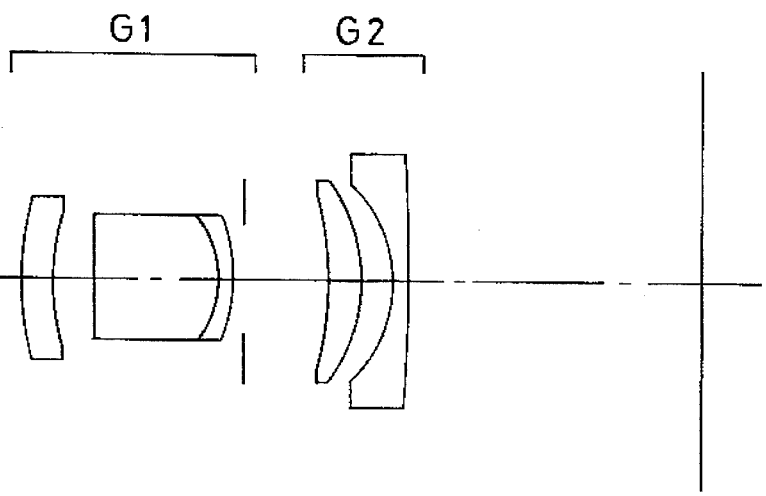
Figure 3:
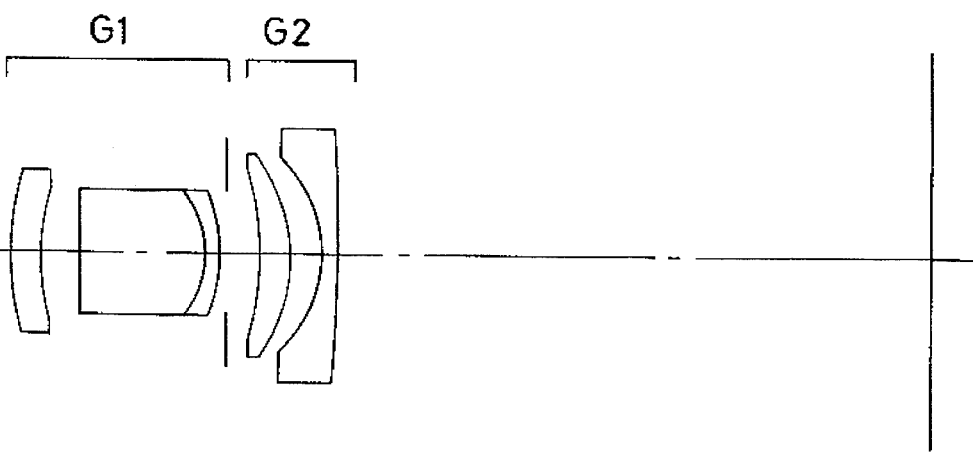

As shown in FIGS. 3(a) to 3(c), which is a sectional view similar to FIGS. 1(a) to 1(c), Example 6 includes a meniscus lens L1 of weak power having a convex surface directed toward the object side, a biconvex lens L2, a negative meniscus lens L3 having a convex surface directed toward the image side, a stop, a positive meniscus lens L4 having a convex surface directed toward the image side, and a negative meniscus lens L5 having a convex surface directed toward the image side. The second and third lenses L2 and L3 are cemented together. The first, second and third lenses L1, L2 and L3 constitute a 1-st lens unit G1, and the fourth and fifth lenses L4 and L5 constitute a 2-nd lens unit G2. Aspherical surfaces are used for the object-side surface of the first lens L1 and the object-side surface of the fifth lens L5. In addition, an aspherical surface is used for the image-side surface of the fourth lens L4. In this Example, the positive lens group in the 1-st lens unit G1 is composed of a positive lens and a negative lens, which are arranged in the mentioned order in reverse relation to Examples 1 to 5, thereby enhancing the correcting effect made by the negative lens, and thus minimizing the occurrence of distortion and comatic aberration.

Examples 7 to 10 are two-unit zoom lens systems including, in order from the object side, a 1-st lens unit G1 which is composed of a lens L1 of extremely small power, a negative lens L2, a positive lens L31, and a positive lens L32, and a 2-nd lens unit G2 which is composed of a positive lens L4, and a negative lens L5 having an aspherical surface. Although the first and fifth lenses L1 and L5 have aspherical surfaces in these Examples, aspherical surfaces may be used for other lens elements in the same way as in Examples 1 to 5.

Figure 4:
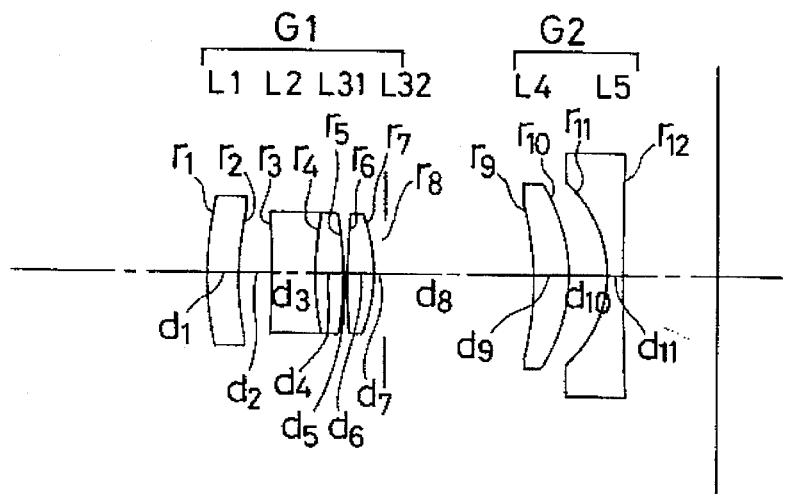
FIGS. 4(a) to 4(c) are a sectional view showing Example 7 of the two-unit zoom lens system according to the present invention in a similar manner to FIGS. 1(a) to 1(c).
Figure 4:
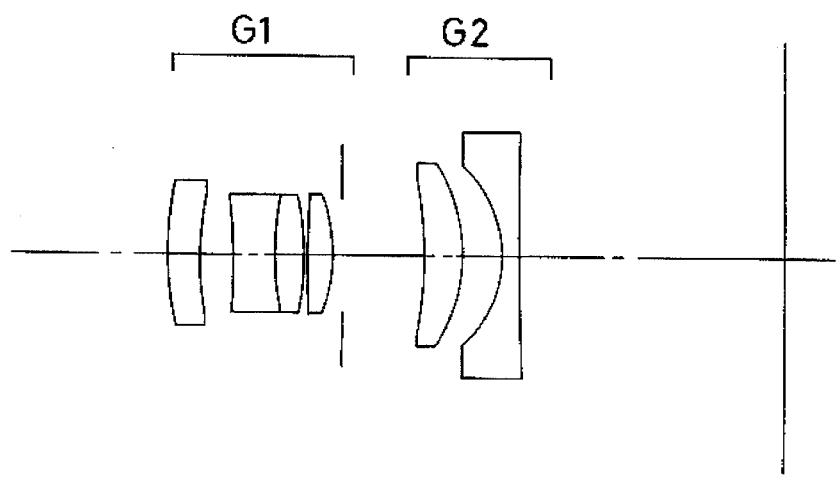
Figure 4:
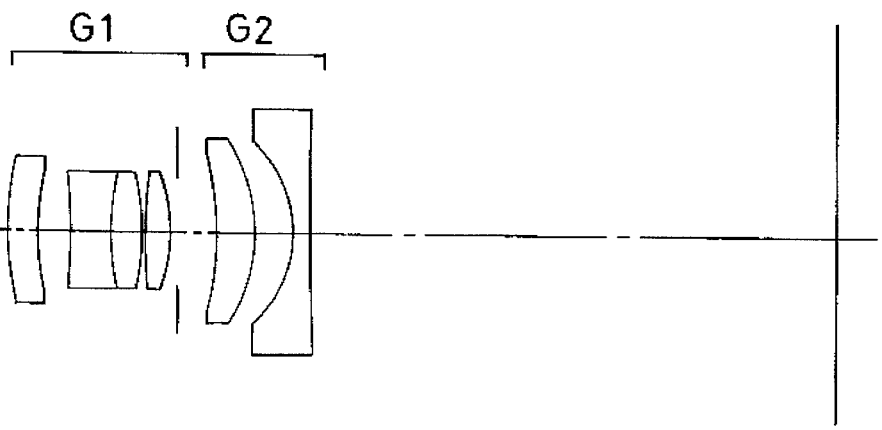

As shown in FIGS. 4(a) to 4(c), which is a sectional view similar to FIGS. 1(a) to 1(c), Example 7 includes a meniscus lens L1 of weak power having a convex surface directed toward the object side, a biconcave lens L2, a biconvex lens L31, a biconvex lens L32, a stop, a positive meniscus lens L4 having a convex surface directed toward the image side, and a biconcave lens L5. The second lens L2 and the front divided lens L31 of the third lens are cemented together. Aspherical surfaces are used for two surfaces, that is, the object-side surface of the first lens L1 and the object-side surface of the fifth lens L5. This arrangement shows that it is possible to construct a lens system of satisfactorily good performance by using only two aspherical surfaces.

Figure 5:
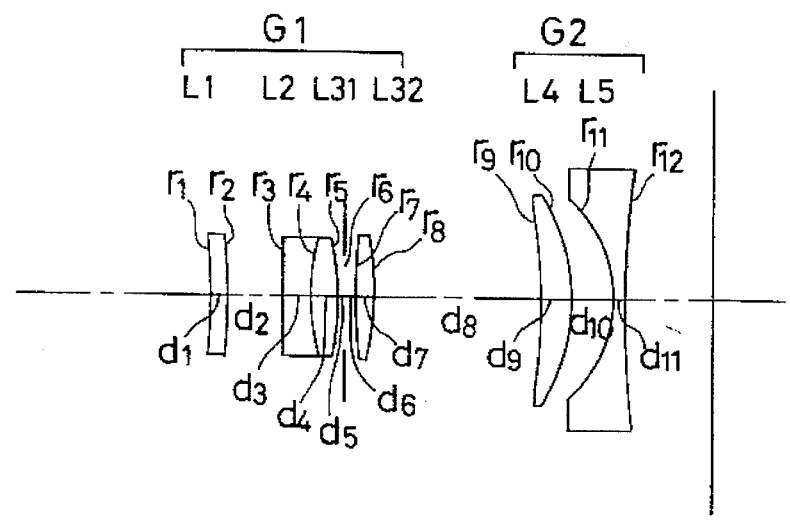
FIGS. 5(a) to 5(c) are a sectional view showing Example 8 of the two-unit zoom lens system according to the present invention in a similar manner to FIGS. 1(a) to 1(c).
Figure 5:
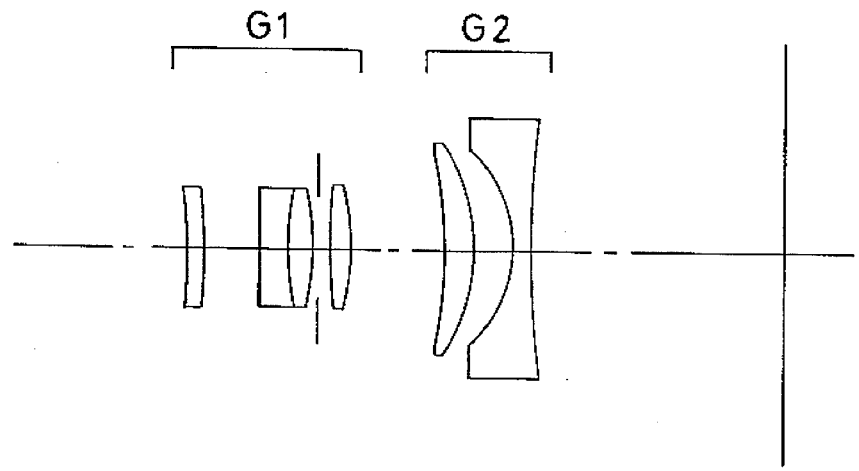
Figure 5:
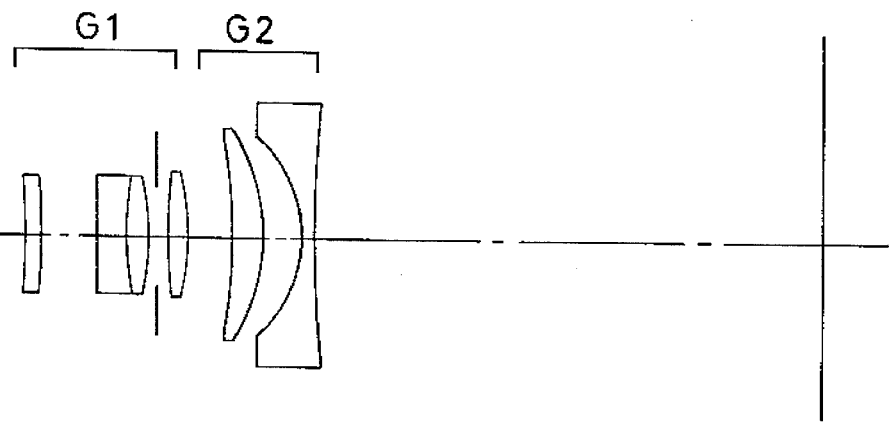

As shown in FIGS. 5(a) to 5(c), which is a sectional view similar to FIGS. 1(a) to 1(c), Example 8 includes a meniscus lens L1 of weak power having a convex surface directed toward the image side, a biconcave lens L2, a biconvex lens L31, a stop, a biconvex lens L32, a positive meniscus lens L4 having a convex surface directed toward the image side, and a biconcave lens L5. The second lens L2 and the front divided lens L31 of the third lens are cemented together. Aspherical surfaces are used for the object-side surface of the first lens L1 and the object-side surface of the fifth lens L5. In addition, an aspherical surface is used for the image-side surface of the first lens L1, and the stop is disposed between the divided lenses L31 and L32 of the third lens, thereby enabling the upper bundle of rays to be cut off. As a result, it becomes easy to correct comatic aberration, and the performance improves.

Figure 6:
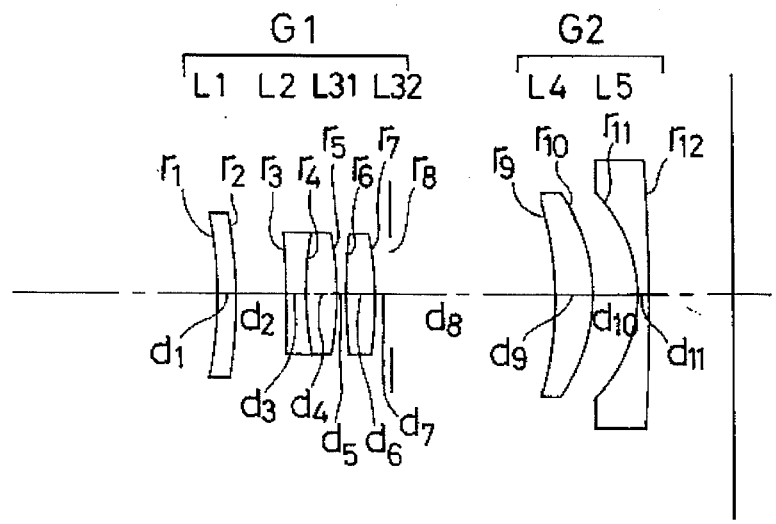
FIGS. 6(a) to 6(c) are a sectional view showing Example 9 of the two-unit zoom lens system according to the present invention in a similar manner to FIGS. 1(a) to 1(c).
Figure 6:
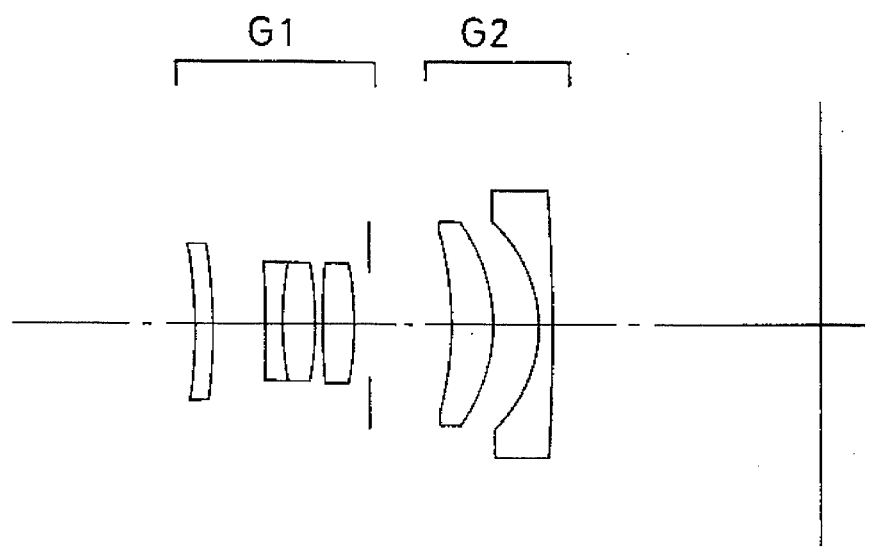
Figure 6:
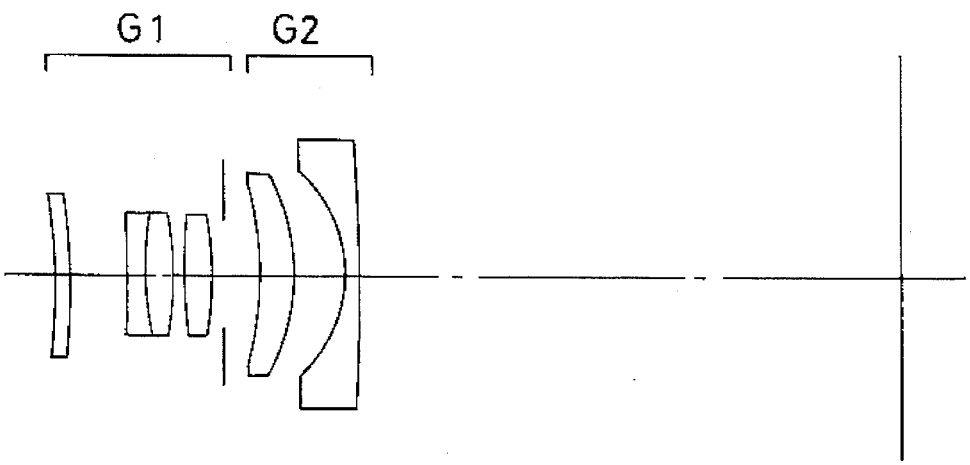

As shown in FIGS. 6(a) to 6(c), which is a sectional view similar to FIGS. 1(a) to 1(c), Example 9 includes a meniscus lens L1 of weak power having a convex surface directed toward the image side, a biconcave lens L2, a biconvex lens L31, a biconvex lens L32, a stop, a positive meniscus lens L4 having a convex surface directed toward the image side, and a negative meniscus lens L5 having a convex surface directed toward the image side. The second lens L2 and the front divided lens L31 of the third lens are cemented together. Aspherical surfaces are used for four surfaces, that is, the object-side surface of the first lens L1, the object-side surface of the fifth lens L5, the image-side surface of the first lens L1, and the image-side surface of the rear divided lens L32 of the third lens, thereby minimizing the occurrence of spherical aberration and astigmatism.

Example 10 has a lens arrangement approximately similar to that of Example 9. Aspherical surfaces are used for the object-side surface of the first lens L1 and the object-side surface of the fifth lens L5. In addition, an aspherical surface is used for the image-side surface of the first lens L1, thereby considerably reducing aberration produced in the 1-st lens unit G1.

Lens data in Examples will be shown below. In the following, reference symbol f denotes the focal length, $F_{NO}$ is F-number, $\omega$ is the half view angle, $f_B$ is the back focus, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $\gamma_{d1}, \gamma_{d2} \ldots$ are the Abbe's numbers of the lenses. Assuming that the direction of the optical axis is x and a direction perpendicular to the optical axis is y, the aspherical configuration is expressed by $$x=(y^2/r)/[1+\{1-P(y^2/r^2)\}^{+e\sqrt{ra}\ 1/2}+ee\ ]+A_4y^4+A_6y^6+A_8y^8+A_{10}y^{10}$$

where r is the paraxial curvature radius; P is a conical coefficient; and $A_4$, $A_6$, $A_8$, and $A_{10}$ are aspherical coefficients.

Example 1

$f = 39.3 \sim 58.6 \sim 87.3$
$F_{NO} = 3.6 \sim 5.3 \sim 8.0$
$\omega = 27.68 \sim 20.01 \sim 13.84°$
$f_B = 8.40 \sim 27.08 \sim 56.46$

| | | | | | |
|---|---|---|---|---|---|
| $r_1 =$ | 27.9305 (Aspheric) | $d_1 = 2.972$ | | $n_{d1} = 1.49241$ | $v_{d1} = 57.66$ |
| $r_2 =$ | 28.2870 | $d_2 = 3.860$ | | | |
| $r_3 =$ | 182.7288 | $d_3 = 1.492$ | | $n_{d2} = 1.80518$ | $v_{d2} = 25.43$ |
| $r_4 =$ | 28.9922 | $d_4 = 9.059$ | | $n_{d3} = 1.58904$ | $v_{d3} = 53.20$ |
| $r_5 =$ | −17.1386 | $d_5 = 1.020$ | | | |
| $r_6 =$ | ∞ (Stop) | $d_6 =$ (Variable) | | | |
| $r_7 =$ | −34.8961 | $d_7 = 3.800$ | | $n_{d4} = 1.51742$ | $v_{d4} = 52.41$ |
| $r_8 =$ | −14.0728 (Aspheric) | $d_8 = 3.314$ | | | |
| $r_9 =$ | −11.1946 (Aspheric) | $d_9 = 1.500$ | | $n_{d5} = 1.62041$ | $v_{d5} = 60.27$ |
| $r_{10} =$ | 603.2023 | | | | |

Zooming Spaces

| f | 39.3 | 58.6 | 87.3 |
|---|---|---|---|
| $d_6$ | 16.4561 | 8.2524 | 2.3597 |

Aspherical Coefficients

1st surface

$P = 0.2083$
$A_4 = -0.50613 \times 10^{-4}$
$A_6 = -0.23409 \times 10^{-6}$
$A_8 = -0.18797 \times 10^{-8}$
$A_{10} = -0.37562 \times 10^{-11}$

8th surface

$P = 1.0000$
$A_4 = 0.46253 \times 10^{-4}$
$A_6 = -0.17117 \times 10^{-6}$
$A_8 = 0.39666 \times 10^{-8}$
$A_{10} = -0.88487 \times 10^{-11}$

9th surface

$P = 0.4686$
$A_4 = 0.37011 \times 10^{-4}$
$A_6 = -0.25047 \times 10^{-6}$
$A_8 = 0.45294 \times 10^{-8}$
$A_{10} = -0.12636 \times 10^{-10}$

Example 2

$f = 39.3 \sim 58.6 \sim 87.3$
$F_{NO} = 3.6 \sim 5.3 \sim 8.0$
$\omega = 27.70 \sim 19.83 \sim 13.84°$
$f_B = 8.38 \sim 26.80 \sim 54.57$

| | | | | | |
|---|---|---|---|---|---|
| $r_1 =$ | 20.8500 (Aspheric) | $d_1 = 2.972$ | | $n_{d1} = 1.49241$ | $v_{d1} = 57.66$ |
| $r_2 =$ | 20.5960 | $d_2 = 3.950$ | | | |
| $r_3 =$ | 158.2728 | $d_3 = 1.488$ | | $n_{d2} = 1.76182$ | $v_{d2} = 26.55$ |
| $r_4 =$ | 19.5147 | $d_4 = 5.479$ | | $n_{d3} = 1.53172$ | $v_{d3} = 48.90$ |
| $r_5 =$ | −13.6443 (Aspheric) | $d_5 = 1.020$ | | | |
| $r_6 =$ | ∞ (Stop) | $d_6 =$ (Variable) | | | |
| $r_7 =$ | −29.9941 | $d_7 = 2.800$ | | $n_{d4} = 1.59551$ | $v_{d4} = 39.21$ |
| $r_8 =$ | −17.4046 | $d_8 = 4.529$ | | | |
| $r_9 =$ | −12.0415 (Aspheric) | $d_9 = 1.500$ | | $n_{d5} = 1.61700$ | $v_{d5} = 62.79$ |
| $r_{10} =$ | −505.1517 | | | | |

-continued

Zooming Spaces

| f | 39.3 | 58.6 | 87.3 |
|---|------|------|------|
| $d_6$ | 15.4290 | 7.6729 | 2.3269 |

Aspherical Coefficients

1st surface $P = 0.6356$
$A_4 = -0.75600 \times 10^{-4}$
$A_6 = -0.65928 \times 10^{-6}$
$A_8 = -0.36358 \times 10^{-8}$
$A_{10} = -0.17207 \times 10^{-11}$ 5th surface $P = 1.0000$
$A_4 = -0.77610 \times 10^{-5}$
$A_6 = 0.42218 \times 10^{-7}$
$A_8 = -0.85332 \times 10^{-8}$
$A_{10} = 0.83842 \times 10^{-10}$ 9th surface $P = 1.0000$
$A_4 = 0.35031 \times 10^{-4}$
$A_6 = 0.19579 \times 10^{-6}$
$A_8 = -0.20278 \times 10^{-10}$
$A_{10} = 0.23826 \times 10^{-10}$ Example 3

$f = 39.3 \sim 58.6 \sim 87.3$
$F_{NO} = 3.6 \sim 5.3 \sim 8.0$
$\omega = 28.17 \sim 20.13 \sim 13.86°$
$f_B = 8.92 \sim 26.34 \sim 53.41$

| $r_1 =$ | 22.8111 (Aspheric) | $d_1 = 2.972$ | $n_{d1} = 1.49241$ | $v_{d1} = 57.66$ |
|---|---|---|---|---|
| $r_2 =$ | 22.7070 | $d_2 = 4.378$ | | |
| $r_3 =$ | 76.6091 | $d_3 = 1.488$ | $n_{d2} = 1.76182$ | $v_{d2} = 26.55$ |
| $r_4 =$ | 17.0366 | $d_4 = 6.327$ | $n_{d3} = 1.53172$ | $v_{d3} = 48.90$ |
| $r_5 =$ | −13.8580 | $d_5 = 1.020$ | | |
| $r_6 =$ | ∞ (Stop) | $d_6 =$ (Variable) | | |
| $r_7 =$ | −35.9097 (Aspheric) | $d_7 = 2.800$ | $n_{d4} = 1.58144$ | $v_{d4} = 40.75$ |
| $r_8 =$ | −19.1747 | $d_8 = 4.016$ | | |
| $r_9 =$ | −10.5833 (Aspheric) | $d_9 = 1.500$ | $n_{d5} = 1.61700$ | $v_{d5} = 62.79$ |
| $r_{10} =$ | −136.48890 | | | |

Zooming Spaces

| f | 39.3 | 58.6 | 87.3 |
|---|------|------|------|
| $d_6$ | 13.5710 | 6.9828 | 2.3900 |

Aspherical Coefficients

1st surface $P = 0.6976$
$A_4 = -0.72477 \times 10^{-4}$
$A_6 = -0.45871 \times 10^{-6}$
$A_8 = -0.28035 \times 10^{-8}$
$A_{10} = -0.23705 \times 10^{-10}$ 7th surface $P = 1.0000$
$A_4 = 0.28342 \times 10^{-4}$
$A_6 = 0.53354 \times 10^{-6}$
$A_8 = -0.47826 \times 10^{-8}$
$A_{10} = 0.51792 \times 10^{-10}$ 9th surface $P = 1.0000$
$A_4 = 0.38979 \times 10^{-4}$
$A_6 = -0.26114 \times 10^{-6}$
$A_8 = 0.65227 \times 10^{-8}$
$A_{10} = -0.13600 \times 10^{-10}$ Example 4

$f = 39.3 \sim 58.6 \sim 87.3$
$F_{NO} = 3.6 \sim 5.3 \sim 8.0$

-continued $\omega = 28.03\sim19.96\sim13.89°$
$f_B = 8.63\sim28.60\sim57.76$

| | | | | | |
|---|---|---|---|---|---|
| $r_1 =$ | 21.0387 (Aspheric) | $d_1 = 3.000$ | | $n_{d1} = 1.52540$ | $v_{d1} = 56.25$ |
| $r_2 =$ | 16.3364 | $d_2 = 9.016$ | | | |
| $r_3 =$ | 47.9732 | $d_3 = 1.500$ | | $n_{d2} = 1.84666$ | $v_{d2} = 23.78$ |
| $r_4 =$ | 25.2724 | $d_4 = 3.552$ | | $n_{d3} = 1.51821$ | $v_{d3} = 65.04$ |
| $r_5 =$ | −16.1220 | $d_5 = 1.000$ | | | |
| $r_6 =$ | ∞ (Stop) | $d_6 =$ (Variable) | | | |
| $r_7 =$ | −85.2106 | $d_7 = 3.800$ | | $n_{d4} = 1.59551$ | $v_{d4} = 39.21$ |
| $r_8 =$ | −17.2334 | $d_8 = 2.717$ | | | |
| $r_9 =$ | −11.5051 (Aspheric) | $d_9 = 1.500$ | | $n_{d5} = 1.65830$ | $v_{d5} = 57.33$ |
| $r_{10} =$ | 135.9149 | | | | |

Zooming Spaces

| f | 39.3 | 58.6 | 87.3 |
|---|---|---|---|
| $d_6$ | 17.4323 | 8.5296 | 2.6627 |

Aspherical Coefficients

1st surface $P = 0.5937$
$A_4 = -0.42400 \times 10^{-4}$
$A_6 = -0.25743 \times 10^{-6}$
$A_8 = -0.13347 \times 10^{-8}$
$A_{10} = -0.44132 \times 10^{-11}$

9th surface $P = 0.1524$
$A_4 = -0.17211 \times 10^{-4}$
$A_6 = -0.13201 \times 10^{-6}$
$A_8 = 0.13956 \times 10^{-8}$
$A_{10} = -0.77899 \times 10^{-11}$

Example 5

$f = 39.3\sim58.6\sim87.3$
$F_{NO} = 3.6\sim5.3\sim8.0$
$\omega = 27.90\sim19.82\sim13.80°$
$f_B = 8.58\sim27.65\sim55.80$

| | | | | | |
|---|---|---|---|---|---|
| $r_1 =$ | 27.8618 (Aspheric) | $d_1 = 2.972$ | | $n_{d1} = 1.49241$ | $v_{d1} = 57.66$ |
| $r_2 =$ | 21.5741 (Aspheric) | $d_2 = 3.000$ | | | |
| $r_3 =$ | 45.5607 | $d_3 = 1.500$ | | $n_{d2} = 1.80610$ | $v_{d2} = 33.27$ |
| $r_4 =$ | 17.2884 | $d_4 = 4.805$ | | $n_{d3} = 1.51633$ | $v_{d3} = 64.15$ |
| $r_5 =$ | −14.1883 | $d_5 = 1.000$ | | | |
| $r_6 =$ | ∞ (Stop) | $d_6 =$ (Variable) | | | |
| $r_7 =$ | −35.8786 | $d_7 = 3.800$ | | $n_{d4} = 1.58144$ | $v_{d4} = 40.75$ |
| $r_8 =$ | −15.9844 | $d_8 = 3.541$ | | | |
| $r_9 =$ | −10.8629 (Aspheric) | $d_9 = 1.500$ | | $n_{d5} = 1.61700$ | $v_{d5} = 62.79$ |
| $r_{10} =$ | −2837.7511 | | | | |

Zooming Spaces

| f | 39.3 | 58.6 | 87.3 |
|---|---|---|---|
| $d_6$ | 15.6489 | 7.7855 | 2.5505 |

Aspherical Coefficients

1st surface $P = 0.0285$
$A_4 = -0.20398 \times 10^{-3}$
$A_6 = -0.10877 \times 10^{-5}$
$A_8 = -0.66569 \times 10^{-8}$
$A_{10} = 0.14048 \times 10^{-9}$

2nd surface $P = 0.4621$
$A_4 = -0.15556 \times 10^{-3}$
$A_6 = -0.86412 \times 10^{-6}$
$A_8 = 0.37076 \times 10^{-8}$
$A_{10} = 0.14490 \times 10^{-9}$

9th surface $P = 0.1590$
$A_4 = -0.28298 \times 10^{-4}$ $A_6 = -0.19299 \times 10^{-6}$
$A_8 = 0.24336 \times 10^{-8}$
$A_{10} = -0.12189 \times 10^{-10}$

Example 6

$f = 39.3\text{~}58.6\text{~}87.3$
$F_{NO} = 3.6\text{~}5.3\text{~}8.0$
$\omega = 28.96\text{~}20.25\text{~}13.92°$
$f_B = 9.00\text{~}29.69\text{~}60.39$

| | | | | |
|---|---|---|---|---|
| $r_1 =$ | 28.5530 (Aspheric) | $d_1 = 2.972$ | $n_{d1} = 1.49241$ | $v_{d1} = 57.66$ |
| $r_2 =$ | 23.1074 | $d_2 = 4.124$ | | |
| $r_3 =$ | 1807.4703 | $d_3 = 13.117$ | $n_{d2} = 1.68250$ | $v_{d2} = 44.65$ |
| $r_4 =$ | −10.3061 | $d_4 = 1.500$ | $n_{d3} = 1.84666$ | $v_{d3} = 23.78$ |
| $r_5 =$ | −16.9815 | $d_5 = 1.020$ | | |
| $r_6 =$ | ∞ (Stop) | $d_6 =$ (Variable) | | |
| $r_7 =$ | −43.8870 | $d_7 = 3.700$ | $n_{d4} = 1.63980$ | $v_{d4} = 34.48$ |
| $r_8 =$ | −15.7475 (Aspheric) | $d_8 = 2.980$ | | |
| $r_9 =$ | −12.6578 (Aspheric) | $d_9 = 1.400$ | $n_{d5} = 1.78650$ | $v_{d5} = 50.00$ |
| $r_{10} =$ | −436.8209 | | | |

Zooming Spaces

| f | 39.3 | 58.6 | 87.3 |
|---|---|---|---|
| $d_6$ | 17.5096 | 8.6071 | 2.7017 |

Aspherical Coefficients

1st surface $P = -0.6861$
$A_4 = -0.33482 \times 10^{-4}$
$A_6 = -0.19568 \times 10^{-6}$
$A_8 = -0.11318 \times 10^{-8}$
$A_{10} = 0.64678 \times 10^{-11}$

8th surface $P = 1.0000$
$A_4 = 0.46011 \times 10^{-4}$
$A_6 = -0.43037 \times 10^{-6}$
$A_8 = 0.78353 \times 10^{-8}$
$A_{10} = -0.35679 \times 10^{-10}$

9th surface $P = 0.10000$
$A_4 = 0.70743 \times 10^{-4}$
$A_6 = -0.18323 \times 10^{-6}$
$A_8 = 0.61425 \times 10^{-8}$
$A_{10} = -0.15133 \times 10^{-10}$

Example 7

$f = 39.3\text{~}58.6\text{~}87.3$
$F_{NO} = 3.6\text{~}5.3\text{~}8.0$
$\omega = 27.87\text{~}19.93\text{~}13.85°$
$f_B = 9.32\text{~}26.51\text{~}52.35$

| | | | | |
|---|---|---|---|---|
| $r_1 =$ | 29.5140 (Aspheric) | $d_1 = 3.000$ | $n_{d1} = 1.49241$ | $v_{d1} = 57.66$ |
| $r_2 =$ | 30.0239 | $d_2 = 3.241$ | | |
| $r_3 =$ | −120.0437 | $d_3 = 4.133$ | $n_{d2} = 1.74950$ | $v_{d2} = 35.27$ |
| $r_4 =$ | 30.0346 | $d_4 = 2.966$ | $n_{d3} = 1.46450$ | $v_{d3} = 65.94$ |
| $r_5 =$ | −37.1100 | $d_5 = 0.348$ | | |
| $r_6 =$ | 179.0379 | $d_6 = 2.846$ | $n_{d4} = 1.50378$ | $v_{d4} = 66.81$ |
| $r_7 =$ | −15.5612 | $d_7 = 1.149$ | | |
| $r_8 =$ | ∞ (Stop) | $d_8 =$ (Variable) | | |
| $r_9 =$ | −43.9333 | $d_9 = 4.024$ | $n_{d5} = 1.61293$ | $v_{d5} = 37.00$ |
| $r_{10} =$ | −17.6226 | $d_{10} = 3.901$ | | |
| $r_{11} =$ | −11.2977 (Aspheric) | $d_{11} = 1.506$ | $n_{d6} = 1.69680$ | $v_{d6} = 55.52$ |
| $r_{12} =$ | 1225.6345 | | | |

Zooming Spaces

| f | 39.3 | 58.6 | 87.3 |
|---|---|---|---|
| $d_8$ | 14.3440 | 7.7455 | 3.2397 |

-continued

Aspherical Coefficients

1st surface $P = -0.0167$
$A_4 = -0.66871 \times 10^{-4}$
$A_6 = -0.35691 \times 10^{-6}$
$A_8 = -0.41682 \times 10^{-8}$
$A_{10} = 0.24435 \times 10^{-10}$

11th surface $P = 0.5733$
$A_4 = 0.18106 \times 10^{-4}$
$A_6 = -0.14726 \times 10^{-6}$
$A_8 = 0.53742 \times 10^{-8}$
$A_{10} = -0.30790 \times 10^{-10}$

Example 8

$f = 39.3 \sim 58.6 \sim 87.3$
$F_{NO} = 3.6 \sim 5.3 \sim 8.0$
$\omega = 28.11 \sim 19.93 \sim 13.84°$
$f_B = 8.48 \sim 25.98 \sim 51.66$

| | | | | | |
|---|---|---|---|---|---|
| $r_1 =$ | −601.6186 (Aspheric) | $d_1 = 1.697$ | | $n_{d1} = 1.52540$ | $v_{d1} = 56.25$ |
| $r_2 =$ | −305.8471 (Aspheric) | $d_2 = 5.763$ | | | |
| $r_3 =$ | −154.9839 | $d_3 = 2.814$ | | $n_{d2} = 1.74950$ | $v_{d2} = 35.27$ |
| $r_4 =$ | 27.3482 | $d_4 = 2.742$ | | $n_{d3} = 1.51633$ | $v_{d3} = 64.15$ |
| $r_5 =$ | −27.7756 | $d_5 = 0.700$ | | | |
| $r_6 =$ | ∞ (Stop) | $d_6 = 1.000$ | | | |
| $r_7 =$ | 73.35 | $d_7 = 2.150$ | | $n_{d4} = 1.50378$ | $v_{d4} = 66.81$ |
| $r_8 =$ | −26.5899 | $d_8 =$ (Variable) | | | |
| $r_9 =$ | −79.0261 | $d_9 = 3.364$ | | $n_{d5} = 1.63980$ | $v_{d5} = 34.48$ |
| $r_{10} =$ | −21.4393 | $d_{10} = 3.965$ | | | |
| $r_{11} =$ | '13.2391 (Aspheric) | $d_{11} = 1.506$ | | $n_{d6} = 1.75500$ | $v_{d6} = 52.33$ |
| $r_{12} =$ | 136.4861 | | | | |

Zooming Spaces

| $f$ | 39.3 | 58.6 | 87.3 |
|---|---|---|---|
| $d_6$ | 16.5690 | 9.2187 | 4.3890 |

Aspherical Coefficients

1st surface $P = -6.5417$
$A_4 = -0.24124 \times 10^{-3}$
$A_6 = -0.34102 \times 10^{-6}$
$A_8 = 0.88744 \times 10^{-8}$
$A_{10} = 0.20211 \times 10^{-10}$

2nd surface $P = -10.0283$
$A_4 = -0.21236 \times 10^{-3}$
$A_6 = -0.29449 \times 10^{-8}$
$A_8 = 0.10644 \times 10^{-7}$
$A_{10} = -0.22049 \times 10^{-10}$

11th surface $P = 1.0000$
$A_4 = 0.38597 \times 10^{-4}$
$A_6 = 0.11052 \times 10^{-6}$
$A_8 = 0.39029 \times 10^{-9}$
$A_{10} = 0.69659 \times 10^{-11}$

Example 9

$f = 39.3 \sim 58.6 \sim 87.3$
$F_{NO} = 3.6 \sim 5.3 \sim 8.0$
$\omega = 28.19 \sim 20.01 \sim 13.89°$
$f_B = 8.12 \sim 26.36 \sim 53.12$

| | | | | | |
|---|---|---|---|---|---|
| $r_1 =$ | −584.9799 (Aspheric) | $d_1 = 1.722$ | | $n_{d1} = 1.52540$ | $v_{d1} = 56.25$ |
| $r_2 =$ | −301.5062 (Aspheric) | $d_2 = 5.152$ | | | |
| $r_3 =$ | −100.3465 | $d_3 = 1.786$ | | $n_{d2} = 1.74950$ | $v_{d2} = 35.27$ |
| $r_4 =$ | 33.5048 | $d_4 = 3.252$ | | $n_{d3} = 1.51633$ | $v_{d3} = 64.15$ |
| $r_5 =$ | −28.8051 | $d_5 = 0.667$ | | | |
| $r_6 =$ | 86.8929 | $d_6 = 3.092$ | | $n_{d4} = 1.50378$ | $v_{d4} = 66.81$ |
| $r_7 =$ | −23.6539 (Aspheric) | $d_7 = 1.149$ | | | |
| $r_8 =$ | ∞ (Stop) | $d_8 =$ (Variable) | | | |

-continued

| | | | | | |
|---|---|---|---|---|---|
| $r_9 =$ | −37.0803 | | $d_9 = 4.067$ | $n_{d5} = 1.61293$ | $v_{d5} = 37.00$ |
| $r_{10} =$ | −18.1939 | $d_{11} = 0.993$ | $n_{d6} = 1.72600$ | $v_{d6} = 53.56$ | |
| $r_{12} =$ | −259.7439 | | | | |

Zooming Spaces

| f | 39.3 | 58.6 | 87.3 |
|---|---|---|---|
| $d_8$ | 15.8994 | 8.2564 | 3.2397 |

Aspherical Coefficients

1st surface $P = -6.5417$
$A_4 = -0.22134 \times 10^{-3}$
$A_6 = 0.16151 \times 10^{-7}$
$A_8 = 0.10884 \times 10^{-7}$
$A_{10} = -0.41095 \times 10^{-10}$

2nd surface $P = -10.0283$
$A_4 = -0.18566 \times 10^{-3}$
$A_6 = 0.46816 \times 10^{-6}$
$A_8 = 0.81391 \times 10^{-8}$
$A_{10} = -0.36921 \times 10^{-10}$

7th surface $P = 1.0000$
$A_4 = -0.78408 \times 10^{-6}$
$A_6 = -0.13307 \times 10^{-6}$
$A_8 = 0.34306 \times 10^{-8}$
$A_{10} = -0.21929 \times 10^{-10}$

11th surface $P = 1.0000$
$A_4 = 0.32084 \times 10^{-4}$
$A_6 = -0.59633 \times 10^{-7}$
$A_8 = 0.32509 \times 10^{-8}$
$A_{10} = -0.70634 \times 10^{-12}$

Example 10

$f = 39.3 \sim 58.6 \sim 87.3$
$F_{NO} = 3.6 \sim 5.3 \sim 8.0$
$\omega = 28.15 \sim 19.98 \sim 13.88°$
$f_B = 8.11 \sim 26.30 \sim 52.97$

| | | | | |
|---|---|---|---|---|
| $r_1 =$ | −577.2554 (Aspheric) | $d_1 = 1.661$ | $n_{d1} = 1.52540$ | $v_{d1} = 56.25$ |
| $r_2 =$ | −299.4361 (Aspheric) | $d_2 = 5.063$ | | |
| $r_3 =$ | −62.6196 | $d_3 = 1.680$ | $n_{d2} = 1.74950$ | $v_{d2} = 35.27$ |
| $r_4 =$ | 45.3765 | $d_4 = 3.265$ | $n_{d3} = 1.51633$ | $v_{d3} = 64.15$ |
| $r_5 =$ | −24.3885 | $d_5 = 0.650$ | | |
| $r_6 =$ | 78.4443 | $d_6 = 3.070$ | $n_{d4} = 1.50378$ | $v_{d4} = 66.81$ |
| $r_7 =$ | −24.3373 | $d_7 = 1.149$ | | |
| $r_8 =$ | ∞ (Stop) | $d_8 =$ (Variable) | | |
| $r_9 =$ | −38.3705 | $d_9 = 4.024$ | $n_{d5} = 1.60342$ | $v_{d5} = 38.01$ |
| $r_{10} =$ | −18.3614 | $d_{10} = 4.474$ | | |
| $r_{11} =$ | −12.8237 (Aspheric) | $d_{11} = 1.506$ | $n_{d6} = 1.74100$ | $v_{d6} = 52.68$ |
| $r_{12} =$ | −393.7515 | | | |

Zooming Spaces

| f | 39.3 | 58.6 | 87.3 |
|---|---|---|---|
| $d_8$ | 15.6352 | 8.1530 | 3.2397 |

Aspherical Coefficients

1st surface $P = -6.5417$
$A_4 = -0.24341 \times 10^{-3}$
$A_6 = 0.82272 \times 10^{-7}$
$A_8 = 0.65860 \times 10^{-8}$
$A_{10} = 0.98647 \times 10^{-11}$

2nd surface $P = -10.0283$
$A_4 = -0.20934 \times 10^{-3}$
$A_6 = 0.66351 \times 10^{-6}$
$A_8 = 0.10169 \times 10^{-8}$ $A_{10} = 0.39174 \times 10^{-10}$ 11th surface $P = 1.0000$
$A_4 = 0.26712 \times 10^{-4}$
$A_6 = 0.33523 \times 10^{-7}$
$A_8 = 0.11775 \times 10^{-8}$
$A_{10} = 0.63124 \times 10^{-11}$ FIGS. 7(a)(1) to 16(c) astigmatism, distortion and lateral chromatic aberration at the wide end FIGS. 7(a)(1) to 7(a)(4), 8(a)(1) to 8(a)(4), 9(a)(4), 10(a)(1) to 10(a)(4), 11(a)(1) to 11(a)(4), 12(a)(1) to 12(a)(4), 13(a)(1) to 13(a)(4), 14(a)(1) to 14(a)(4), 15(a)(1) to 15(a)(4), 16(a)(1) to 16(a)(4), the standard position FIGS. 7(b)(1) to 7(b)(4), 8(b)(1) to 8(b)(4), 9(b)(1) to 9(b)(4), 10(b)(1) to 10(b)(4), 11(b)(1) to 11(b)(4), 12(b)(1) to 12(b)(4), 13(b)(1) to 13(b)(4), 14(b)(1) to 14(b)(4), 15(b)(1) to 15(b)(4), 16(b)(1) to 16(b)(4), and the tele end FIGS. 7(c)(1) to 7(c)(4), 8(c)(1) to 8(c)(4), 9(c)(1) to 9(c)(4), 10(c)(1) to 10(c)(4), 11(c)(1) to 11(c)(4), 12(c)(1) to 12(c)(4), 13(c)(1) to 13(c)(4), 14(c)(1) to 14(c)(4), 15(c)(1) to 15(c)(4), 16(c)(1) to 16(c)(4) in Examples 1 to 10.

Table below shows the values of the above-described conditions (1) to (6) in the above Examples.

| Conditions | (1) | (2) | (3) | (4) | (5) | (6) |
|---|---|---|---|---|---|---|
| Example 1 | 0.801 | 0.810 | 0.072 | — | 0.05799 | 7.86 |
| Example 2 | 0.787 | 0.769 | 0.072 | — | 0.01965 | 23.58 |
| Example 3 | 0.748 | 0.693 | 0.072 | — | 0.01222 | 22.04 |
| Example 4 | 0.816 | 0.837 | −0.490 | — | 0.03850 | 18.12 |
| Example 5 | 0.784 | 0.771 | −0.380 | — | 0.03790 | 22.04 |
| Example 6 | 0.802 | 0.852 | −0.291 | — | 0.03242 | 15.52 |
| Example 7 | 0.753 | 0.681 | 0.072 | 0.600 | 0.02230 | 18.52 |
| Example 8 | 0.793 | 0.712 | 0.072 | 0.700 | 0.02294 | 17.85 |
| Example 9 | 0.793 | 0.741 | 0.072 | 0.499 | 0.01653 | 16.56 |
| Example 10 | 0.785 | 0.732 | 0.072 | 0.160 | 0.01372 | 14.67 |

Figure 17:
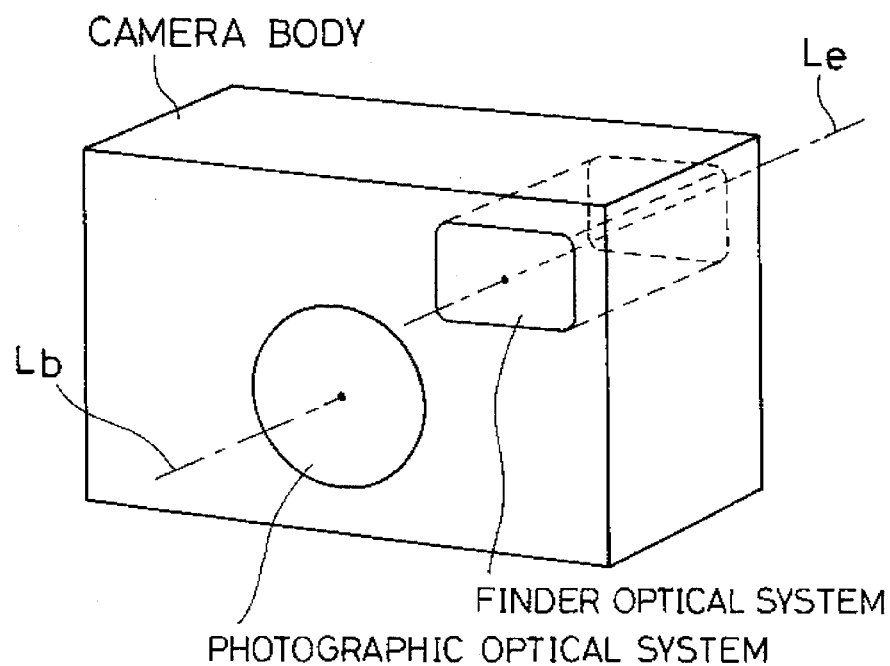
FIG. 17 is a perspective view showing the arrangement of a compact camera.
Figure 18:
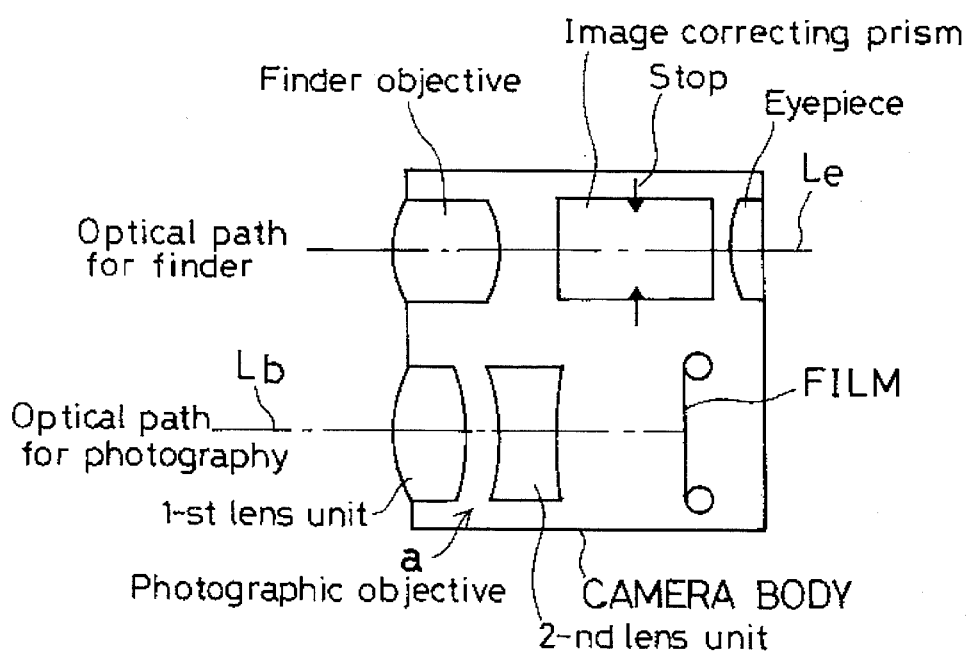
FIG. 18 is a sectional view of the compact camera shown in FIG. 17.

The two-unit zoom lens system of the present invention as described in the foregoing Examples may be employed, for example, as a photographic objective a of a compact camera arranged as shown in the perspective view of FIG. 17 and also in the sectional view of FIG. 18. In these figures, $L_b$ denotes an optical path for photography, and $L_e$ an optical path for finder. The two optical paths $L_b$ and $L_e$ lie parallel to each other. An image of an object is observed through a finder that is composed of a finder objective, an image correcting prism, a stop, and an eyepiece, and formed on a film by the objective a.

As will be clear from the foregoing description, in the two-unit zoom lens system of the present invention, the variation of the focal point caused by changes in temperature-humidity conditions is minimized despite the use of a plastic lens. Moreover, the plastic lens is used as a lens in the 1-st lens unit that is the closest to the object side, and an aspherical surface is used for a negative lens in the 2-nd lens unit, thereby making it possible to construct a low-cost, high-performance zoom lens system which has a zoom ratio exceeding 2.

What we claim is:

1. A two-unit zoom lens system comprising, in order from an object side:

a 1-st lens unit of positive power, said 1-st lens unit being composed, in order from the object side, of:
a lens of extremely small power having an aspherical surface,
a positive lens group, and
a stop; and a 2-nd lens unit of negative power, said 2-nd lens unit being composed, in order from the object side, of:
a positive lens, and
a negative lens having an aspherical surface;

said two-unit zoom lens system satisfying the following condition:

$$0.6 < F_1/f_W < 0.9 \quad (1)$$

where $F_1$ is a focal length of said 1-st lens unit, and $f_W$ is a focal length of said two-unit zoom lens system at a wide end.

2. A two-unit zoom lens system comprising, in order from an object side:

a 1-st lens unit of positive power, said 1-st lens unit being composed, in order from the object side, of:
a lens of extremely small power having an aspherical surface,
a positive lens group, and
a stop; and a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \quad (2)$$

where $F_2$ is a focal length of said 2-nd lens unit, and $f_w$ is a focal length of said two-unit zoom lens system at a wide end.

3. A two-unit zoom lens system comprising, in order from an object side:

a 1-st lens unit of positive power, said 1-st lens unit being composed, in order from the object side, of:
an aspherical lens of extremely small power having an aspherical surface,
a positive lens group, and
a stop.; and a 2-nd lens unit of negative power, said 2-nd lens unit being composed, in order from the object side, of:
a positive lens, and
a negative lens having an aspherical surface;

said aspherical lens of extremely small power satisfying the following condition:

$$-0.9 < f_T/f_1 < 0.9 \quad (3)$$

where $f_T$ is a focal length of said two-unit zoom lens system at a tele end, and $f_1$ is a focal length of the lens in said 1-st lens unit that is closest to the object side.

4. A two-unit zoom lens system comprising, in order from an object side:

a 1-st lens unit of positive power, said 1-st lens unit being composed, in order from the object side, of:
an aspherical lens of extremely small power having an aspherical surface, a positive lens group, and
a stop; and
a 2-nd lens unit of negative power, said 2-nd lens unit being composed, in order from the object side, of:
a positive lens, and
a negative lens having an aspherical surface;
said aspherical lens of extremely small power having a negative power which becomes stronger as a distance from an optical axis of said two-unit zoom lens system increases toward a periphery thereof.

5. A two-unit zoom lens system comprising, in order from an object side:
a 1-st lens unit of positive power, said 1-st lens unit being composed, in order from the object side, of:
an aspherical lens of extremely small power having an aspherical surface,
a positive lens group, and
a stop; and
a 2-nd lens unit of negative power, said 2-nd lens unit being composed, in order from the object side, of:
a positive lens, and
a negative lens having an aspherical surface;
said aspherical lens of extremely small power satisfying the following condition:

$$-0.4 < f_T/f_1 < 0.4 \qquad (3')$$

where $f_T$ is a focal length of said two-unit zoom lens system at a tele end, and $f_1$ is a focal length of the lens in said 1-st lens unit that is closest to the object side.

6. A two-unit zoom lens system according to one of claim 1, 2, 3, 4 or 5, wherein:
said negative lens in said 2-nd lens unit has an aspherical surface on the object side.

7. A two-unit zoom lens system comprising, in order from an object side:
a 1-st lens unit of positive power, said 1-st lens unit being composed, in order from the object side, of:
a lens of extremely small power having an aspherical surface with a convex surface directed toward the object side, and
a positive lens group; and
a 2-nd lens unit of negative power, said 2-nd lens unit being composed, in order from the object side, of:
a positive lens, and
a negative lens having an aspherical surface on the object side thereof;
said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

8. A two-unit zoom lens system comprising, in order from an object side:
a 1-st lens unit of positive power, said 1-st lens unit being composed, in order from the object side, of:
a lens of extremely small power having an aspherical surface with a concave surface directed toward the object side,
a positive lens group, and
a stop; and
a 2-nd lens unit of negative power, said 2-nd lens unit being composed, in order from the object side, of:
a positive lens, and
a lens having an aspherical surface;
said two-unit zoom lens system satisfying the following condition:

$$0.6 < F_1/f_W < 0.9 \qquad (1)$$

where $F1$ is a focal length of said 1-st lens unit, and $f_W$ is a focal length of said two-unit zoom lens system at a wide end.

9. A two-unit zoom lens system comprising, in order from an object side:
a 1-st lens unit of positive power, said 1-st lens unit being composed, in order from the object side, of:
a lens of extremely small power having an aspherical surface with a convex surface directed toward the object side,
a negative lens, and
a positive lens; and
a 2-nd lens unit of negative power, said 2-nd lens unit being composed, in order from the object side, of:
a positive lens, and
a negative lens having an aspherical surface;
said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

10. A two-unit zoom lens system comprising, in order from an object side:
a 1-st lens unit of positive power, said 1-st lens unit being composed, in order from the object side, of:
a lens of extremely small power having an aspherical surface with a convex surface directed toward the object side,
a negative lens,
a positive lens, and
a positive lens; and
a 2-nd lens unit of negative power, said 2-nd lens unit being composed, in order from the object side, of:
a positive lens, and
a negative lens having an aspherical surface;
said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

11. A two-unit zoom lens system comprising, in order from an object side:
a 1-st lens unit of positive power, said 1-st lens unit being composed, in order from the object side, of:
a lens of extremely small power having an aspherical surface,
a negative lens,
a positive lens, and
a stop; and
a 2-nd lens unit of negative power, said 2-nd lens unit being composed, in order from the object side, of:
a positive lens, and
a negative lens having an aspherical surface;
said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

12. A two-unit zoom lens system comprising, in order from an object side:
   a 1-st lens unit of positive power, said 1-st lens unit being composed, in order from the object side, of:
      a lens of extremely small power having an aspherical surface,
      a negative lens,
      a positive lens,
      a positive lens, and
      a stop; and
   a 2-nd lens unit of negative power, said 2-nd lens unit being composed, in order from the object side, of:
      a positive lens, and
      a negative lens having an aspherical surface;
   said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

13. A two-unit zoom lens system comprising, in order from an object side:
   a 1-st lens unit of positive power, said 1-st lens unit being composed, in order from the object side, of:
      a lens of extremely small power having an aspherical surface,
      a negative lens,
      a positive lens,
      a stop, and
      a positive lens; and
   a 2-nd lens unit of negative power, said 2-nd lens unit being composed, in order from the object side, of:
      a positive lens, and
      a negative lens having an aspherical surface;
   said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

14. A two-unit zoom lens system comprising, in order from an object side:
   a 1-st lens unit of positive power, said 1-st lens unit being composed, in order from the object side, of:
      a lens of extremely small power having an aspherical surface,
      a positive lens, and
      a negative lens; and
   a 2-nd lens unit of negative power, said 2-nd lens unit being composed, in order from the object side, of:
      a positive lens, and
      a negative lens having an aspherical surface on the object side thereof;
   said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

15. A two-unit zoom lens system comprising, in order from an object side:
   a 1-st lens unit of positive power, said 1-st lens unit being composed, in order from the object side, of:
      a lens of extremely small power having an aspherical surface,
      a cemented lens of a pair of negative and positive lenses, and
      a positive lens; and
   a 2-nd lens unit of negative power, said 2-nd lens unit being composed, in order from the object side, of:
      a positive lens, and
      a negative lens having an aspherical surface;
   said two-unit zoom lens system satisfying the following condition:

$$0.6 < F_1/f_W < 0.9 \qquad (1)$$

where $F_1$ is a focal length of said 1-st lens unit, and $f_W$ is a focal length of said two-unit zoom lens system at a wide end.

16. A two-unit zoom lens system comprising, in order from an object side:
   a 1-st lens unit of positive power, said 1-st lens unit being composed, in order from the object side, of:
      a lens of extremely small power having an aspherical surface with a convex surface directed toward the object side, and
      a positive lens group; and
   a 2-nd lens unit of negative power, said 2-nd lens unit being composed, in order from the object side, of:
      a positive lens, and
      a negative lens having an aspherical surface on the object side thereof;
   said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

17. A two-unit zoom lens system comprising, in order from an object side:
   a 1-st lens unit of positive power, said 1-st lens unit being composed, in order from the object side, of:
      a lens of extremely small power having an aspherical surface with a concave surface directed toward the object side,
      a positive lens group, and
      a stop; and
   a 2-nd lens unit of negative power, said 2-nd lens unit being composed, in order from the object side, of:
      a positive lens, and
      a lens having an aspherical surface;
   said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

18. A two-unit zoom lens system comprising, in order from an object side:
   a 1-st lens unit of positive power, said 1-st lens unit being composed, in order from the object side, of:
      a lens of extremely small power having an aspherical surface with a convex surface directed toward the object side,
      a negative lens, and
      a positive lens; and a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

19. A two-unit zoom lens system comprising, in order from an object side:
a 1-st lens unit of positive power, said 1-st lens unit being composed, in order from the object side, of:
a lens of extremely small power having an aspherical surface with a convex surface directed toward the object side,
a negative lens,
a positive lens, and
a positive lens; and
a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

20. A two-unit zoom lens system comprising, in order from an object side:
a 1-st lens unit of positive power, said 1-st lens unit being composed, in order from the object side, of:
a lens of extremely small power having an aspherical surface,
a negative lens,
a positive lens, and
a stop; and
a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

21. A two-unit zoom lens system comprising, in order from an object side:
a 1-st lens unit of positive power, said 1-st lens unit being composed, in order from the object side, of:
a lens of extremely small power having an aspherical surface,
a negative lens,
a positive lens,
a positive lens, and
a stop; and
a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

22. A two-unit zoom lens system comprising, in order from an object side:
a 1-st lens unit of positive power, said 1-st lens unit being composed, in order from the object side, of:
a lens of extremely small power having an aspherical surface,
a negative lens,
a positive lens,
a stop, and
a positive lens; and
a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

23. A two-unit zoom lens system comprising, in order from an object side:
a 1-st lens unit of positive power, said 1-st lens unit being composed, in order from the object side, of:
a lens of extremely small power having an aspherical surface,
a positive lens, and
a negative lens; and
a 2-nd lens unit of negative power, said 2-nd lens unit being composed, in order from the object side, of:
positive lens, and
a negative lens having an aspherical surface on the object side thereof;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

24. A two-unit zoom lens system comprising, in order from an object side:
a 1-st lens unit of positive power, said 1-st lens unit being composed, in order from the object side, of:
a lens of extremely small power having an aspherical surface,
a cemented lens of a pair of negative and positive lenses, and
a positive lens; and
a 2-nd lens unit of negative power, said 2-nd lens unit being composed, in order from the object side, of:
a positive lens, and
a negative lens having an aspherical surface;

said two-unit zoom lens system satisfying the following condition:

$$0.5 < |F_2|/f_W < 0.9 \qquad (2)$$

where $F_2$ is a focal length of said 2-nd lens unit, and $f_W$ is a focal length of said two-unit zoom lens system at a wide end.

25. A two-unit zoom lens system comprising, in order from an object side:
   a 1-st lens unit of positive power, said 1-st lens unit being composed, in order from the object side, of:
      a lens of extremely small power having an aspherical surface with a convex surface directed toward the object side, and
      a positive lens group; and
   a 2-nd lens unit of negative power, said 2-nd lens unit being composed, in order from the object side, of:
      a positive lens, and
      a negative lens having an aspherical surface on the object side thereof;
   said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

26. A two-unit zoom lens system comprising, in order from an object side:
   a 1-st lens unit of positive power, said 1-st lens unit being composed, in order from the object side, of:
      a lens of extremely small power having an aspherical surface with a concave surface directed toward the object side,
      a positive lens group, and
      a stop; and
   a 2-nd lens unit of negative power, said 2-nd lens unit being composed, in order from the object side, of:
      a positive lens, and
      a lens having an aspherical surface;
   said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

27. A two-unit zoom lens system comprising, in order from an object side:
   a 1-st lens unit of positive power, said 1-st lens unit being composed, in order from the object side, of:
      a lens of extremely small power having an aspherical surface with a convex surface directed toward the object side,
      a negative lens, and
      a positive lens; and
   a 2-nd lens unit of negative power, said 2-nd lens unit being composed, in order from the object side, of:
      a positive lens, and
      a negative lens having an aspherical surface;
   said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

28. A two-unit zoom lens system comprising, in order from an object side:
   a 1-st lens unit of positive power, said 1-st lens unit being composed, in order from the object side, of:
      a lens of extremely small power having an aspherical surface with a convex surface directed toward the object side,
      a negative lens,
      a positive lens, and
      a positive lens; and
   a 2-nd lens unit of negative power, said 2-nd lens unit being composed, in order from the object side, of:
      a positive lens, and
      a negative lens having an aspherical surface;
   said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

29. A two-unit zoom lens system comprising, in order from an object side:
   a 1-st lens unit of positive power, said 1-st lens unit being composed, in order from the object side, of:
      a lens of extremely small power having an aspherical surface,
      a negative lens,
      a positive lens, and
      a stop; and
   a 2-nd lens unit of negative power, said 2-nd lens unit being composed, in order from the object side, of:
      a positive lens, and
      a negative lens having an aspherical surface;
   said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

30. A two-unit zoom lens system comprising, in order from an object side:
   a 1-st lens unit of positive power, said 1-st lens unit being composed, in order from the object side, of:
      a lens of extremely small power having an aspherical surface,
      a negative lens,
      a positive lens,
      a positive lens, and
      a stop; and
   a 2-nd lens unit of negative power, said 2-nd lens unit being composed, in order from the object side, of:
      a positive lens, and
      a negative lens having an aspherical surface;
   said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

31. A two-unit zoom lens system comprising, in order from an object side:

a 1-st lens unit of positive power, said 1-st lens unit being composed, in order from the object side, of:
  a lens of extremely small power having an aspherical surface,
  a negative lens,
  a positive lens,
  a stop, and
  a positive lens; and
a 2-nd lens unit of negative power, said 2-nd lens unit being composed, in order from the object side, of:
  a positive lens, and
  a negative lens having an aspherical surface;
said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

32. A two-unit zoom lens system comprising, in order from an object side:
a 1-st lens unit of positive power, said 1-st lens unit being composed, in order from the object side, of:
  a lens of extremely small power having an aspherical surface,
  a positive lens, and
  a negative lens; and
a 2-nd lens unit of negative power, said 2-nd lens unit being composed, in order from the object side, of:
  a positive lens, and
  a negative lens having an aspherical surface on the object side thereof;
said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

33. A two-unit zoom lens system comprising, in order from an object side:
a 1-st lens unit of positive power, said 1-st lens unit being composed, in order from the object side, of:
  a lens of extremely small power having an aspherical surface,
  a cemented lens of a pair of negative and positive lenses, and
  a positive lens; and
a 2-nd lens unit of negative power, said 2-nd lens unit being composed, in order from the object side, of:
  a positive lens, and
  a negative lens having an aspherical surface;
said aspherical lens of extremely small power satisfying the following condition:

$$-0.9 < f_T/f_1 < 0.9 \qquad (3)$$

where $f_T$ is a focal length of said two-unit zoom lens system at a tele end, and $f_1$ is a focal length of the lens in said 1-st lens unit that is closest to the object side.

34. A two-unit zoom lens system according to one of claims 16–33, wherein upper and lower limits of said conditional expression $f_T/f_1$ are limited as given in the following expression:

$$-0.4 < f_T/f_1 < 0.4$$

where $f_T$ is a focal length of said two-unit zoom lens system at a tele end, and $f_1$ is a focal length of the lens in said 1-st lens unit that is closest to the object side.

35. A two-unit zoom lens system comprising, in order from an object side:
a 1-st lens unit of positive power, said 1-st lens unit being composed, in order from the object side, of:
  a lens of extremely small power having an aspherical surface with a convex surface directed toward the object side, and
  a positive lens group; and
a 2-nd lens unit of negative power, said 2-nd lens unit being composed, in order from the object side, of:
  a positive lens, and
  a negative lens having an aspherical surface on the object side thereof;
said aspherical lens of extremely small power having a negative power which becomes stronger as a distance from an optical axis of said two-unit zoom lens system increases toward a periphery thereof.

36. A two-unit zoom lens system comprising, in order from an object side:
a 1-st lens unit of positive power, said 1-st lens unit being composed, in order from the object side, of:
  a lens of extremely small power having an aspherical surface with a concave surface directed toward the object side,
  a positive lens group, and
  a stop; and
a 2-nd lens unit of negative power, said 2-nd lens unit being composed, in order from the object side, of:
  a positive lens, and
  a lens having an aspherical surface;
said aspherical lens of extremely small power having a negative power which becomes stronger as a distance from an optical axis of said two-unit zoom lens system increases toward a periphery thereof.

37. A two-unit zoom lens system comprising, in order from an object side:
a 1-st lens unit of positive power, said 1-st lens unit being composed, in order from the object side, of:
  a lens of extremely small power having an aspherical surface with a convex surface directed toward the object side,
  a negative lens, and
  a positive lens; and
a 2-nd lens unit of negative power, said 2-nd lens unit being composed, in order from the object side, of:
  a positive lens, and
  a negative lens having an aspherical surface;
said aspherical lens of extremely small power having a negative power which becomes stronger as a distance from an optical axis of said two-unit zoom lens system increases toward a periphery thereof.

38. A two-unit zoom lens system comprising, in order from an object side:
a 1-st lens unit of positive power, said 1-st lens unit being composed, in order from the object side, of:
  a lens of extremely small power having an aspherical surface with a convex surface directed toward the object side,
  a negative lens,
  a positive lens, and
  a positive lens; and
a 2-nd lens unit of negative power, said 2-nd lens unit being composed, in order from the object side, of:

a positive lens, and
a negative lens having an aspherical surface;

said aspherical lens of extremely small power having a negative power which becomes stronger as a distance from an optical axis of said two-unit zoom lens system increases toward a periphery thereof.

39. A two-unit zoom lens system comprising, in order from an object side:

a 1-st lens unit of positive power, said 1-st lens unit being composed, in order from the object side, of:
a lens of extremely small power having an aspherical surface,
a negative lens,
a positive lens, and
a stop; and a 2-nd lens unit of negative power, said 2-nd lens unit being composed, in order from the object side, of:
a positive lens, and
a negative lens having an aspherical surface;

said aspherical lens of extremely small power having a negative power which becomes stronger as a distance from an optical axis of said two-unit zoom lens system increases toward a periphery thereof.

40. A two-unit zoom lens system comprising, in order from an object side:

a 1-st lens unit of positive power, said 1-st lens unit being composed, in order from the object side, of:
a lens of extremely small power having an aspherical surface,
a negative lens,
a positive lens,
a positive lens, and
a stop; and a 2-nd lens unit of negative power, said 2-nd lens unit being composed, in order from the object side, of:
a positive lens, and
a negative lens having an aspherical surface;

said aspherical lens of extremely small power having a negative power which becomes stronger as a distance from an optical axis of said two-unit zoom lens system increases toward a periphery thereof.

41. A two-unit zoom lens system comprising, in order from an object side:

a 1-st lens unit of positive power, said 1-st lens unit being composed, in order from the object side, of:
a lens of extremely small power having an aspherical surface,
a negative lens,
a positive lens,
a stop, and
a positive lens; and a 2-nd lens unit of negative power, said 2-nd lens unit being composed, in order from the object side, of:
a positive lens, and
a negative lens having an aspherical surface;

said aspherical lens of extremely small power having a negative power which becomes stronger as a distance from an optical axis of said two-unit zoom lens system increases toward a periphery thereof.

42. A two-unit zoom lens system comprising, in order from an object side:

a 1-st lens unit of positive power, said 1-st lens unit being composed, in order from the object side, of:
a lens of extremely small power having an aspherical surface,
a positive lens, and
a negative lens; and a 2-nd lens unit of negative power, said 2-nd lens unit being composed, in order from the object side, of:
a positive lens, and
a negative lens having an aspherical surface on the object side thereof;

said aspherical lens of extremely small power having a negative power which becomes stronger as a distance from an optical axis of said two-unit zoom lens system increases toward a periphery thereof.

43. A two-unit zoom lens system comprising, in order from an object side:

a 1-st lens unit of positive power, said 1-st lens unit being composed, in order from the object side, of:
a lens of extremely small power having an aspherical surface,
a cemented lens of a pair of negative and positive lenses, and
a positive lens; and a 2-nd lens unit of negative power, said 2-nd lens unit being composed, in order from the object side, of:
a positive lens, and
a negative lens having an aspherical surface;

said aspherical lens of extremely small power having a negative power which becomes stronger as a distance from an optical axis of said two-unit zoom lens system increases toward a periphery thereof.

* * * * *